(12) United States Patent
Tal et al.

(10) Patent No.: US 11,347,806 B2
(45) Date of Patent: May 31, 2022

(54) DISCOVERY OF CONTAINERIZED PLATFORM AND ORCHESTRATION SERVICES

(71) Applicant: ServiceNow, Inc., Santa Clara, CA (US)

(72) Inventors: Hail Tal, Kohav Yair (IL); Sreenevas Subramaniam, Dublin, CA (US); Shay Herzog, Raanana (IL)

(73) Assignee: ServiceNow, Inc., Santa Clara, CA (US)

( * ) Notice: Subject to any disclaimer, the term of this patent is extended or adjusted under 35 U.S.C. 154(b) by 198 days.

(21) Appl. No.: 16/730,274

(22) Filed: Dec. 30, 2019

(65) Prior Publication Data
US 2021/0200814 A1    Jul. 1, 2021

(51) Int. Cl.
*G06F 16/903* (2019.01)
*G06F 16/53* (2019.01)
*G06F 16/178* (2019.01)

(52) U.S. Cl.
CPC ...... *G06F 16/90335* (2019.01); *G06F 16/178* (2019.01); *G06F 16/53* (2019.01)

(58) Field of Classification Search
CPC .......... G06F 8/20; G06F 8/30; G06F 11/3684; G06F 2009/45583; G06F 8/38; G06F 8/60; G06F 8/71; G06F 9/451; G06F 11/30; G06F 11/3668; G06F 11/3688
See application file for complete search history.

(56) References Cited

U.S. PATENT DOCUMENTS

| 5,978,594 | A  | 11/1999 | Bonnell |
| 6,321,229 | B1 | 11/2001 | Goldman |
| 6,816,898 | B1 | 11/2004 | Scarpelli |

(Continued)

OTHER PUBLICATIONS

Production-Grade Container Orchestration, Kubernetes, Retrieved on May 9, 2018, https://kubernetes.io, 8 Pages.
(Continued)

*Primary Examiner* — Angelica Ruiz
(74) *Attorney, Agent, or Firm* — Fletcher Yoder PC

(57) ABSTRACT

An example computing system includes a database disposed within a remote network management platform associated with a managed network that obtains service from a computing cluster that includes one or more worker nodes configured to execute containerized software applications using a containerized orchestration engine. The computing system also includes a computing device configured to identify a namespace associated with the containerized orchestration engine. The computing device is also configured to query a deployment configuration application programming interface (API) associated with a containerized application platform to obtain deployment configuration data. Further, the computing device is configured to query a build configuration API associated with the containerized application platform to obtain build configuration data. In addition, the computing device is configured to store, in the database, the deployment configuration data, the build configuration data, and one or more relationships between the deployment configuration data and the build configuration data.

20 Claims, 21 Drawing Sheets

(56) References Cited

U.S. PATENT DOCUMENTS

| | | |
|---|---|---|
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,877,783 B1 | 1/2011 | Cline |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,554,750 B2 | 10/2013 | Rangaranjan |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,907,988 B2 | 12/2014 | Poston |
| 9,015,188 B2 | 4/2015 | Behne |
| 9,037,536 B2 | 5/2015 | Vos |
| 9,137,115 B2 | 9/2015 | Mayfield |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2016/0366233 A1 | 12/2016 | Le et al. |
| 2017/0085637 A1* | 3/2017 | Cencini .................... G06F 1/26 |
| 2018/0173502 A1* | 6/2018 | Biskup ..................... G06F 8/71 |
| 2018/0324204 A1* | 11/2018 | McClory .................. G06F 8/30 |
| 2019/0258976 A1* | 8/2019 | Parees ...................... G06F 8/70 |
| 2019/0334778 A1* | 10/2019 | Parthasarathy ..... G06F 9/45558 |

OTHER PUBLICATIONS

The Sysdig Container Toolkit, Sysdig, Retrieved on May 9, 2018, https://sysdig.com/opensource/, 16 Pages.
AI Powered Application and Infrastructure Monitoring, Instana, Retrieved on May 9, 2018, https://www.instana.com/, 8 Pages.
Real-Time Streaming Operational Intelligence for Data-Driven Devops, SignalFx, Retrieved on May 9, 2018, https://signalfx.com/, 8 Pages.
Video entitled "OpenShift Technical Overview"; posted at URL: https://www.youtube.com/watch?v=_kjpXc3sCn0 (screenshots and description included); video uploaded on Feb. 28, 2018, 5 pages.
Video entitled "Overview of OpenShift"; posted at URL: https://www.youtube.com/watch?v=qaIROwHUm54 (screenshots and description included); video uploaded on Mar. 6, 2017, 6 pages.

* cited by examiner

DISCOVERY OF CONTAINERIZED PLATFORM AND ORCHESTRATION SERVICES

BACKGROUND

Management of a network may involve gathering information regarding the configuration and operational aspects of the network. The configuration and operational aspects may include the distribution and availability of software applications across computing devices within the network. Service mapping is a set of operations through which a remote network management platform or other entity can discover and logically organize representations of these computing devices and software applications, and also represent the relationships therebetween.

Traditionally, each software application is configured to be executed by a particular computing device within the network, and depends on a computing environment provided thereby. However, containerized software applications may be dynamically distributed across multiple computing devices over time. Containerized software applications might not persist on the same computing device for as long as the traditionally executed software applications. Service mapping is thus made more difficult by the ephemeral nature of containerized software applications.

In addition, sometimes containerized software applications might be distributed across multiple computing devices within a cluster using a containerized orchestration engine. The containerized orchestration engine may provide a number of services that optimize or simplify the process by which software applications are distributed across the computing devices. In order for a developer, operator, and/or remote user to interface with the containerized orchestration engine, a containerized application platform may be provided. The containerized application platform may streamline the development/operations pipeline associated with the containerized orchestration engine, for example. However, due to the additional software layers associated with containerized provisioning and monitoring, additional complexity may be introduced when attempting to generate a complete service mapping of a network that employs a containerized application platform in addition to a containerized orchestration engine.

SUMMARY

Service mapping creates and maintains maps of computing resources and their dependencies to facilitate analysis of service impacts, help locate outages, and identify other potential issues in a managed network. Among other components, the maps include computing devices, software applications executing thereon, and the dependencies existing therebetween. Conventionally, each software application is developed to be executed in the context of an operating system and computing environment provided by a particular computing device or group thereof. Each software application therefore persists on its corresponding computing device for a prolonged period of time. Service mapping can thus operate with the assumption that once a software application has been detected on a given computing device, it is likely to remain there and its execution is likely to be dependent on successful operation of this computing device.

The process of discovering the different resources available within a managed network may therefore be carried out relatively infrequently (e.g., once daily, weekly, or monthly). Additionally, due to the persistence of conventional software applications on their respective computing devices, the discovery process may uncover software applications regardless of whether they are being executed (e.g., by identifying an executable file of the software application on the computing device).

However, the increasing popularity of executing software applications in containers calls for a different approach to service mapping than the conventional paradigm of software application execution. A container is a stand-alone executable package of a software application that includes components needed to run the software application, including the software application's code, runtime, system tools, system libraries, and settings, among other components. The container allows the software application to run consistently in different operation environments. Execution of containerized software applications is often facilitated by a containerized orchestration engine such as, for example, KUBERNETES®, which groups containers into units called pods.

Pods may be distributed across the available computing resources in a computing cluster to provide a desired number of copies of a software application or its different components. A software application may be scaled up to meet increasing demand therefor by increasing the number of pods in which copies of the software application are being executed, or it may be scaled down by terminating some of the pods. A master node may automatically manage the distribution of pods across the available computing resources. Pods may be destroyed as computing resources experience outages, and may responsively be replaced by other pods on other available computing resources. Thus, the distribution of software applications across the available computing resources in a computing cluster may be highly variable over time. Additionally, replacement pods may be assigned different IP addresses and different identifiers, thus making them difficult to track over time. This is contrary to the conventional paradigm in which software applications are tied to the computing devices on which they execute and the identifiers associated therewith. In some cases, the rate at which pods are terminated and replaced may be greater than the rate of at which software is discovered and mapped using conventional service mapping practices, especially for large-scale software product or services.

Further, some computing clusters may include a containerized application platform, such as RED HAT® OPENSHIFT®, that is provided alongside the containerized orchestration engine (e.g., may share a namespace with the containerized orchestration engine) to enhance capabilities of the containerized orchestration engine and streamline developer and/or operator interaction with the containerized orchestration engine. For example, the containerized application platform may include multiple solutions and/or workarounds for shortcomings present within the containerized orchestration engine (e.g., security and/or efficiency shortcomings). In addition, the containerized application platform may include software-defined networking and/or other networking solutions that are not present within the containerized orchestration engine. The software-defined networking and/or the networking solutions may enhance an end-user's, a developer's, and/or an operator's accessibility of resources of a computing cluster(s) employed to run the containerized software applications accessible. For example, an operator may be able to use a web console to monitor one or more resources being used to execute a given containerized software application during deployment and/or execution of the containerized software application.

The containerized application platform may include other utilities commonly used when interfacing with a containerized orchestration engine, as well. In some cases, the containerized application platform may include one or more storage plug-ins, commonly used container registries (e.g., one or more DOCKER® registries), and/or one or more additional layers of security. For example, the containerized application platform may introduce projects used for deployment and monitoring of containerized software applications to the containerized environment. Such projects may include access authentications based on membership within a specified group, with each specified group being made up of a list of users. In other words, project "A" may only be accessible by group "B," which is made up of users "X," "Y," and "Z." This can be extended further by the containerized application platform, where certain users in a group have different access rights (e.g., right to edit, right to view, etc.).

Still further, the containerized application platform may also enable a streamlined workflow for production, revision, and deployment of containerized software applications. The streamlined workflow may include an image stream that retrieves revised source code images for deployment from an image repository (e.g., a Git repository) and then prepares those revised images for deployment into the computing cluster. Additionally, the containerized application platform may include an automation server (e.g., a Jenkins pipeline). The automation server may allow streamlined deployment from new application code directly to containers. Support for other deployment frameworks, such as service meshes (e.g., Istio) or other middleware (e.g., Knative), may also be included in the containerized application platform.

The containerized orchestration engine and the containerized application platform are intricately intertwined with one another, which is one of the reasons that containerized application platforms are able to augment the containerization orchestration platform in such a streamlined manner. As such, when mapping resources associated with the containerized orchestration engine and/or the containerized application platform, an associated discovery process should take the overlapping structure of the two services into account. This may be accomplished by identifying a namespace associated with the containerized orchestration engine that is used by the containerized application platform (e.g., a namespace used to deploy one or more containerized software applications within the associated computing cluster). The namespace associated with the containerized orchestration engine may be identified during or based on a previous discovery process, in some embodiments. For example, after executing a discovery of a containerized orchestration engine, a remote network management platform may attempt to discover an associated containerized application platform using the namespace associated with the resources of the previously discovered containerized orchestration engine. If, when attempting to discover resources associated with a containerized application platform, it is determined that no containerized application platform shares the namespace with the containerized software engine, then it may be determined that no associated containerized application platform exists and the discovery process may terminate. If, however, there are one or more resources associated with a containerized application platform that share the namespace with the containerized orchestration engine, the discovery process may proceed by identifying those resources.

In some embodiments, the discovery process may first identify a deployment configuration of the containerized application platform by querying an associated deployment configuration application programming interface (API). The deployment configuration may be used within the containerized application platform to template new deployments to pods within the computing cluster. The new deployments may be based on executable images generated/maintained by the containerized application platform, for example. In addition, a replication controller associated with the containerized orchestration engine may be used to deploy the new deployments to the pods and monitor (and repair and/or replace, if necessary) those deployments during execution. After identifying the deployment configuration of the containerized application platform, a build configuration of the containerized application platform may be retrieved by querying an associated build configuration API. The build configuration may be used within the containerized application platform to generate executable images from source code (e.g., to generate the executable images used by the deployment configuration to generate new deployments). Once information about both the deployment configuration and build configuration are retrieved, that information may be stored within a database for later access. Further, the database may also store information about one or more relationships between the build configuration and the deployment configuration (e.g., which namespace they share or any variables and/or data shared and/or communicated between the two objects). The deployment configuration and build configuration are included as examples. Other objects within the respective containerized application platform may be discovered during the discovery process (e.g., routes, groups, users, projects, images, image streams, etc.).

Accordingly, a first example embodiment may involve identifying, by a computing device disposed within a remote network management platform, a namespace associated with a containerized orchestration engine. A database may be also disposed within the remote network management platform. The remote network management platform may be associated with a managed network. The managed network may obtain service from a computing cluster that includes one or more worker nodes. The one or more worker nodes may be configured to execute containerized software applications using the containerized orchestration engine. The containerized orchestration engine may facilitate management, execution, and distribution of the containerized software applications across one or more pods hosted on the one or more worker nodes. The first example embodiment may also involve querying, by the computing device, a deployment configuration application programming interface (API) associated with a containerized application platform that shares the namespace with the containerized orchestration engine to obtain deployment configuration data associated with a deployment configuration of the containerized application platform. The containerized application platform may provide tools for deployment and monitoring of the containerized software applications. The deployment configuration may provide a deployment template by which executable images of the containerized software applications are deployed across the one or more pods using a replication controller of the containerized orchestration engine. Further, the first example embodiment may involve querying, by the computing device, a build configuration API associated with the containerized application platform to obtain build configuration data associated with a build configuration of the containerized application platform. The build configuration may provide a build template by which executable images of the containerized software applications are built from source code within the containerized application platform. In addition, the first example embodiment may involve storing, in the database and by the computing device, the deployment configuration data, the build configuration data, and one or more relationships between the deployment configuration data and the build configuration data.

In a second example embodiment, an article of manufacture may include a non-transitory computer-readable medium, having stored thereon program instructions that, upon execution by a computing device disposed within a remote network management platform, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

In a fifth embodiment, a computing system may include a database disposed within a remote network management platform associated with a managed network. The managed network may obtain service from a computing cluster that includes one or more worker nodes. The one or more worker nodes may be configured to execute containerized software applications using a containerized orchestration engine. The containerized orchestration engine may facilitate management, execution, and distribution of the containerized software applications across one or more pods hosted on the one or more worker nodes. The computing system may also include a computing device disposed within the remote network management platform. The computing device may be configured to identify a namespace associated with the containerized orchestration engine. The computing device may also be configured to query a deployment configuration API associated with a containerized application platform that shares the namespace with the containerized orchestration engine to obtain deployment configuration data associated with a deployment configuration of the containerized application platform. The containerized application platform may provide tools for deployment and monitoring of the containerized software applications. The deployment configuration may provide a deployment template by which executable images of the containerized software applications are deployed across the one or more pods using a replication controller of the containerized orchestration engine. The computing device may further be configured to query a build configuration API associated with the containerized application platform to obtain build configuration data associated with a build configuration of the containerized application platform. The build configuration may provide a build template by which executable images of the containerized software applications are built from source code within the containerized application platform. In addition, the computing device may be configured to store, in the database, the deployment configuration data, the build configuration data, and one or more relationships between the deployment configuration data and the build configuration data.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
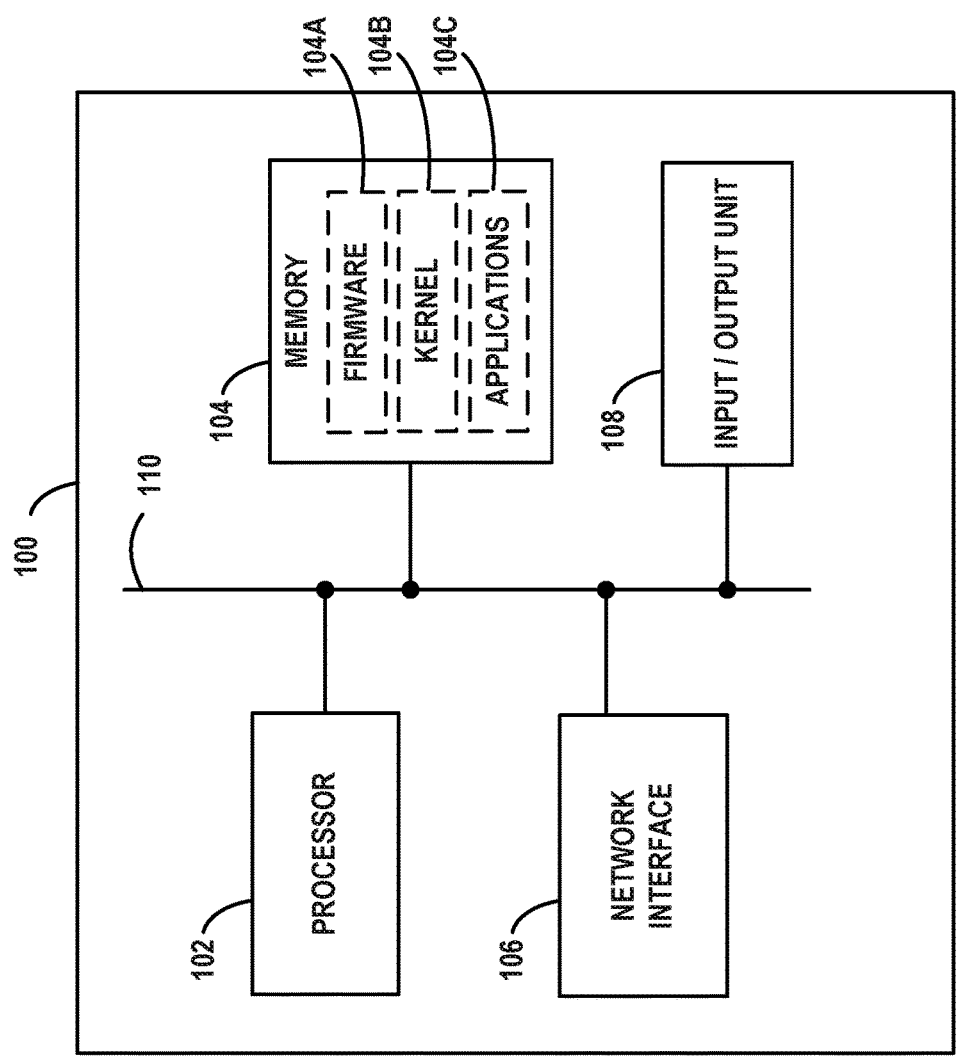
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
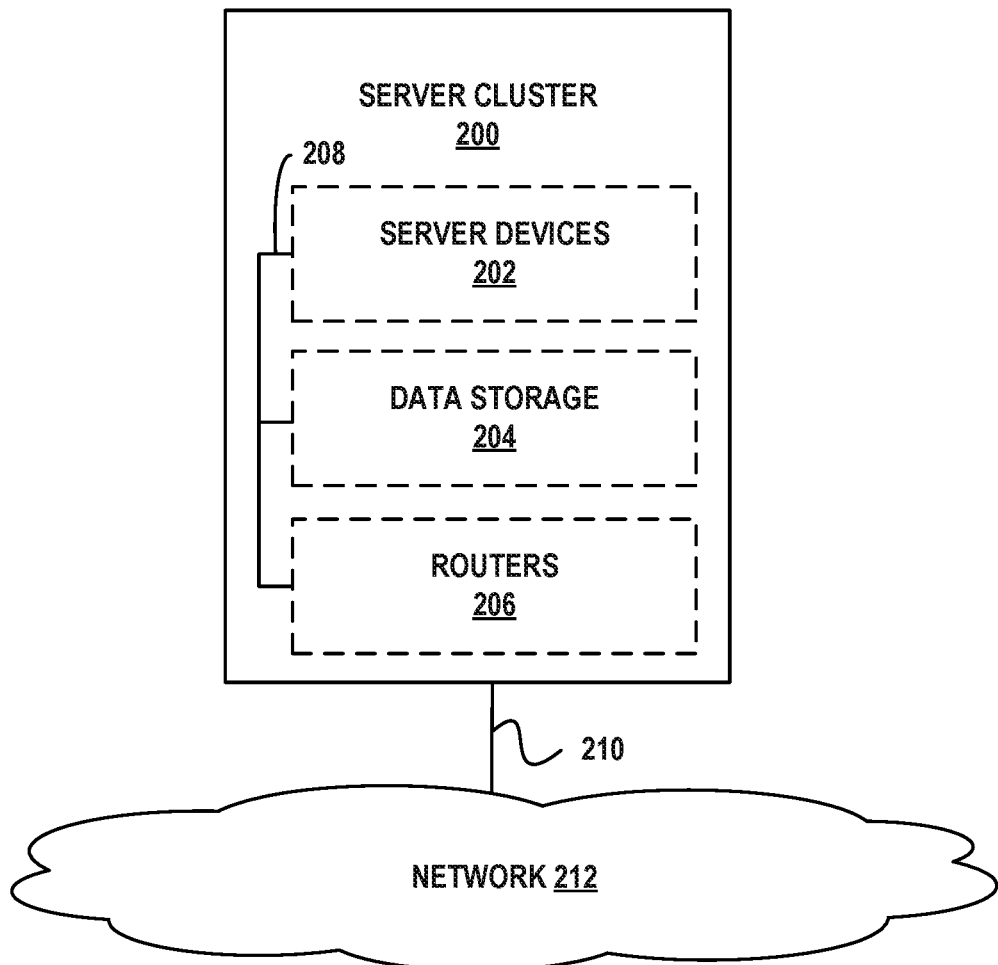
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
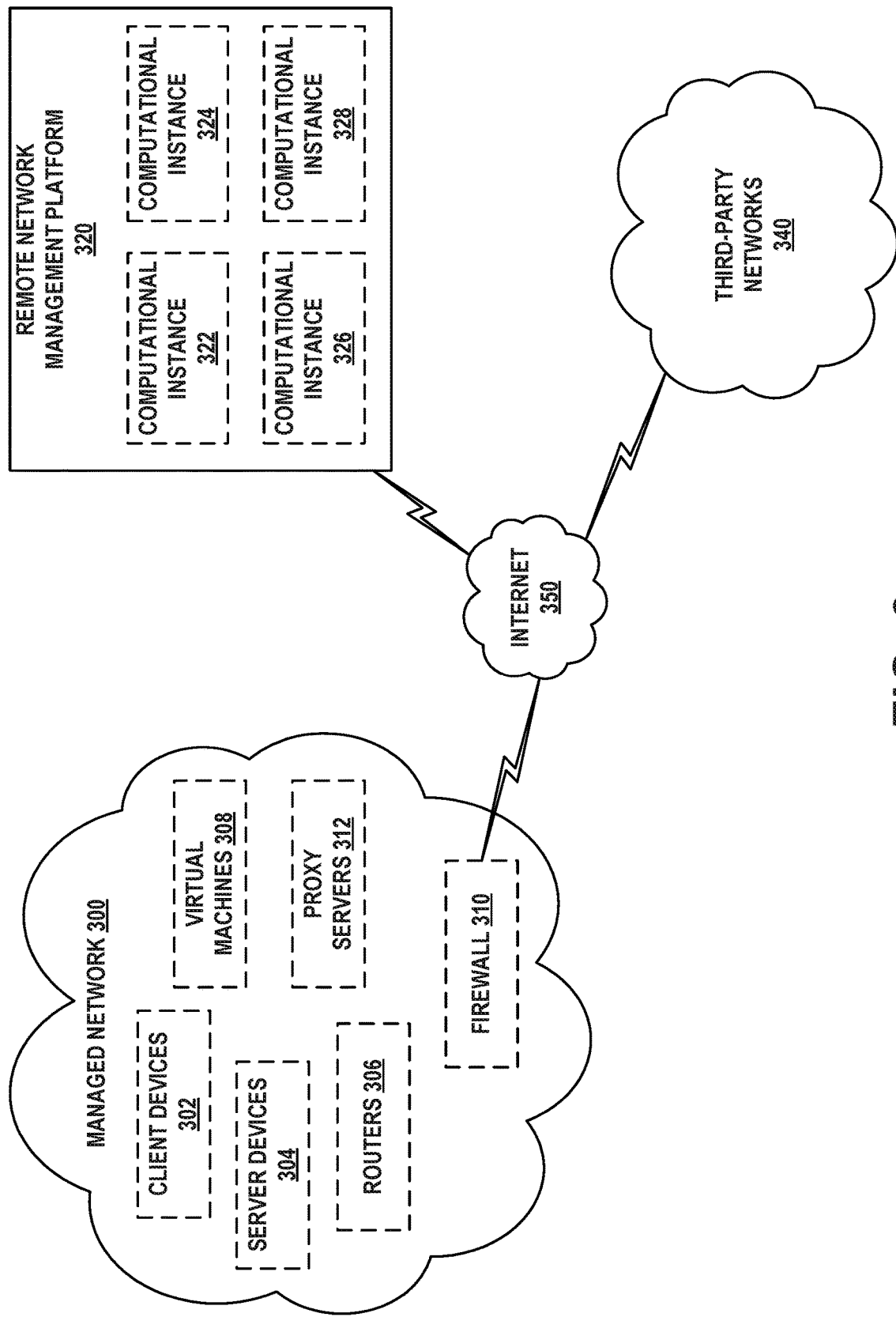
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
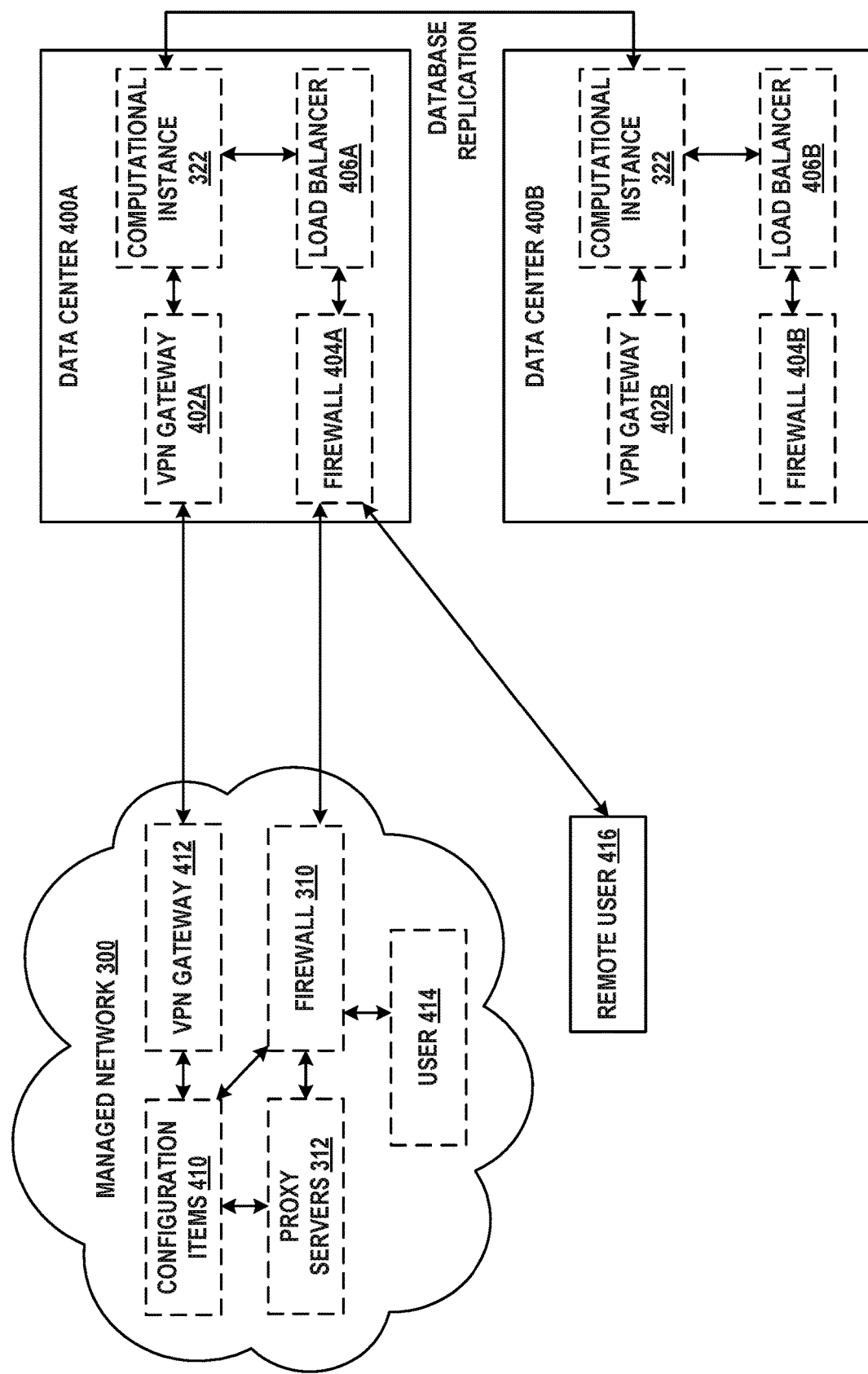
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
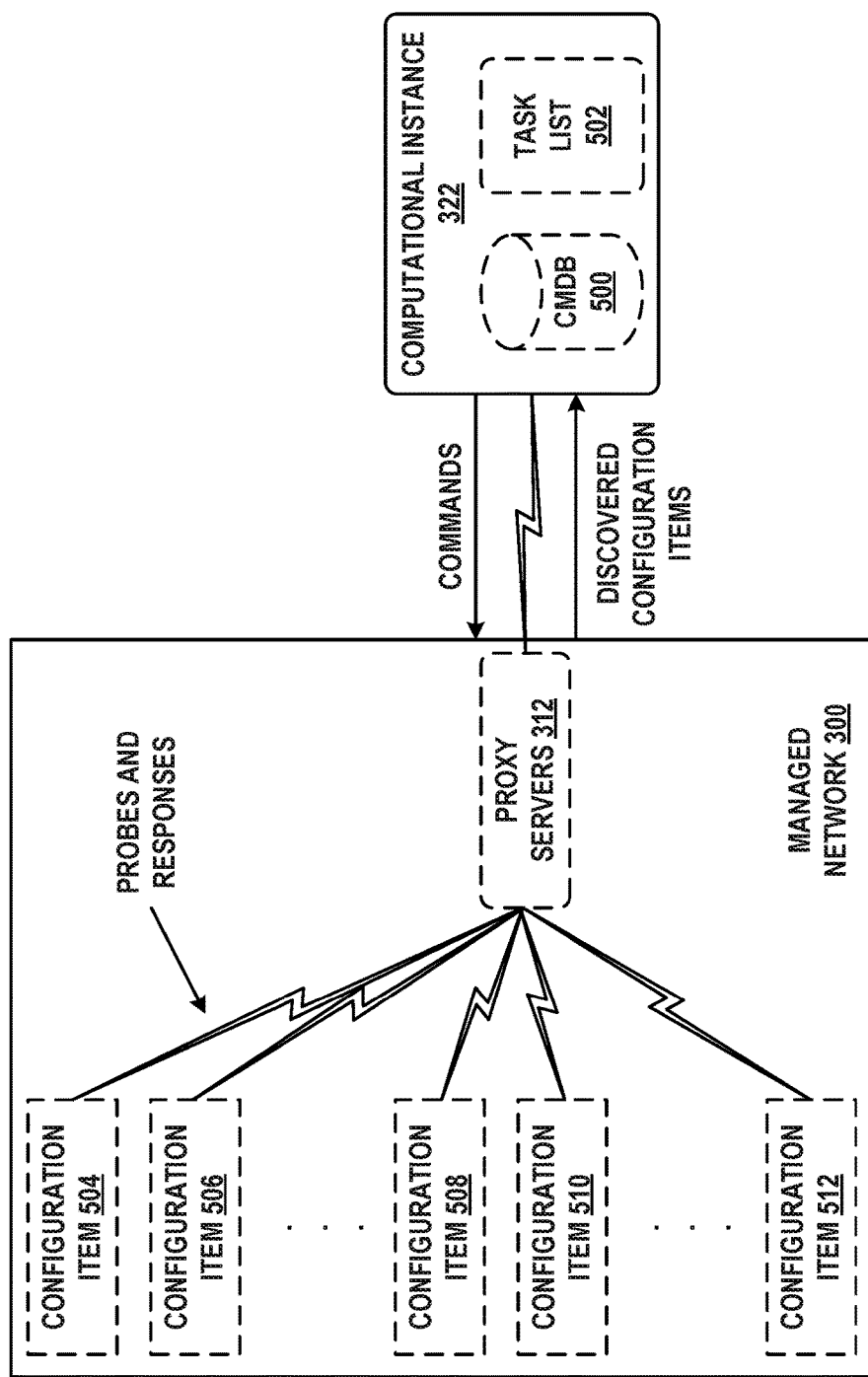
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
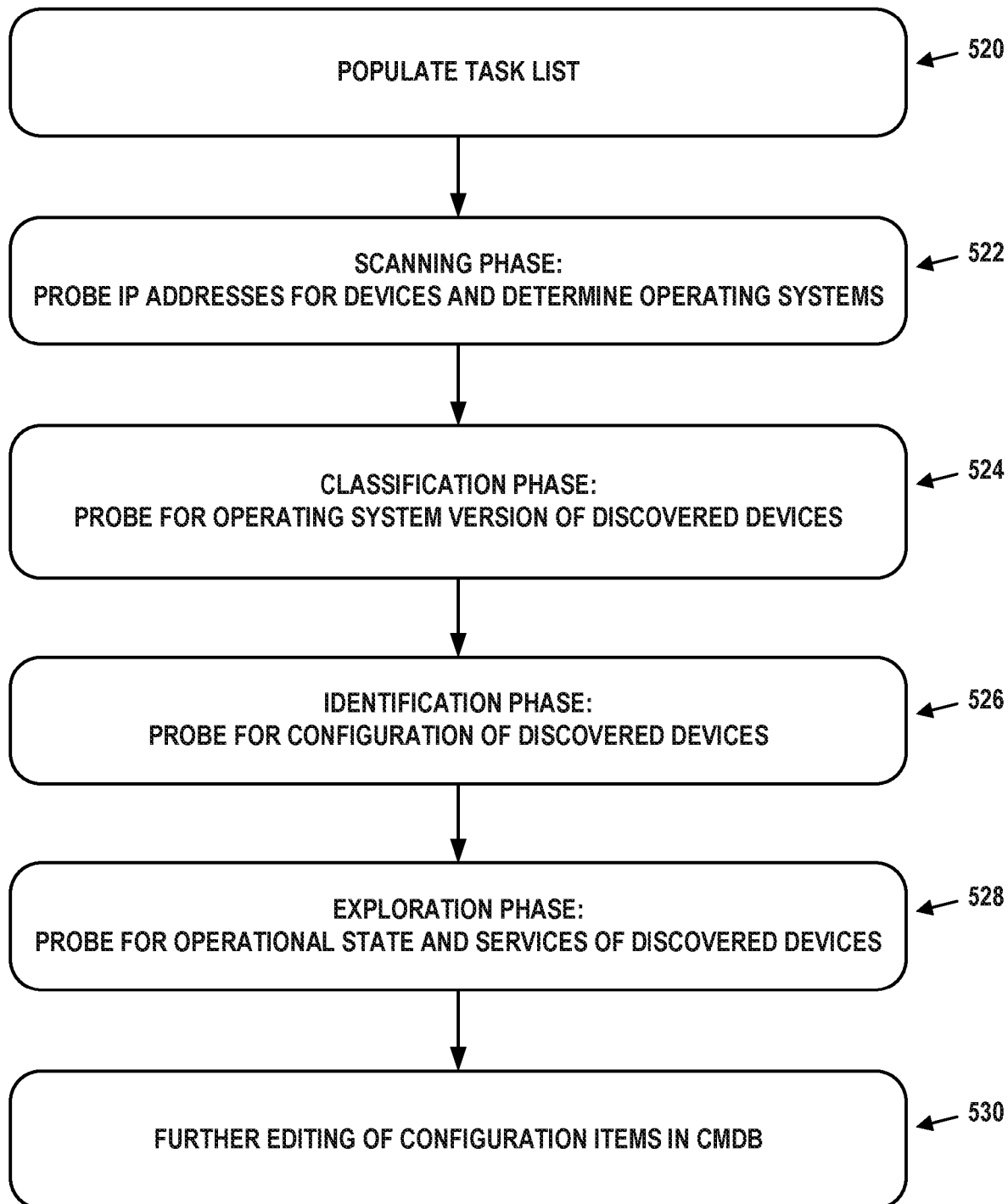
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE PLATFORM FOR CONTAINERIZED SOFTWARE APPLICATIONS

A containerized software application may be a software application configured to be executed in a container. A container, in turn, is a software package that includes an entire runtime environment needed to execute a given software application. The container may thus include therein the code (e.g., binary code) that defines the software application, libraries utilized by the software application, and configuration files utilized by the software application, among other elements needed for execution of the software application. As a result, the containerized software application can be executed on a wide variety of operating systems and underlying infrastructures independently of the computing environment provided thereby. Application containerization may, in some cases, be referred to as operating system virtualization. Application containerization may allow for the existence of multiple distinct and isolated user-spaces on a single machine (e.g., physical machine or virtual machine). Thus, an application executing within a container may see only its own container's resources, but not the resources of other containers.

Figure 6A:
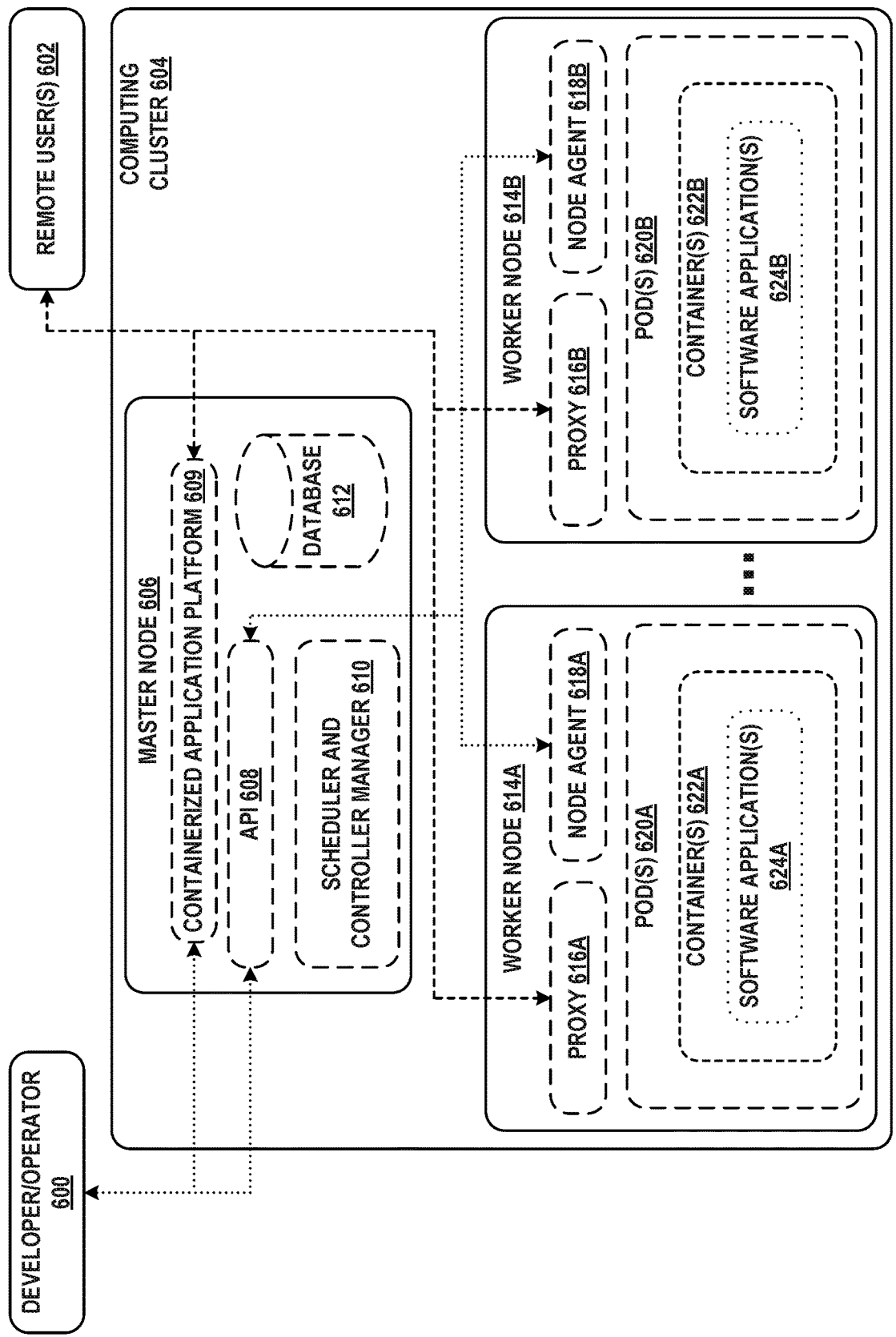
FIG. 6A depicts an architecture for executing containerized software applications, in accordance with example embodiments.

FIG. 6A illustrates an example platform for managing and executing containerized software applications. Computing cluster 604 may include master node 606 and a plurality of worker nodes, including worker nodes 614A and 614B. Worker nodes 614A and 614B may host software application(s) 624A and 624B, respectively. Software application(s) 624A and 624B may be stand-alone software applications or components of a larger software product. Software application(s) 624A and 624B may each represent distinct software modules. In some cases, however, software application(s) 624A and 624B may also include copies or duplicates of the same software application (e.g., to provide redundancy or handle a given traffic load to the software product).

Software application(s) 624A and 624B may be executable within corresponding container(s) 622A and 622B, respectively. Generally, each of container(s) 622A and 622B may be configured to execute a single software application of software application(s) 624A and 624B. However, in some cases, some of container(s) 622A and 622B may also be configured to execute therein multiple software applications of software application(s) 624A and 624B.

Container(s) 622A and 622B may be organized into pod(s) 620A and 620B, respectively. Each of pod(s) 620A and 620B may include therein one or more containers. Containers in a pod may share storage space, an internet protocol (IP) address (i.e., each pod may be assigned a distinct IP address), IP port space, and operating system namespace, among other shared resources. Pod(s) 620A and 620B may be, for example, KUBERNETES® pods, DOCKER SWARM® tasks, MESOS® pods, or KONTENA® stacks, among other possibilities. Pod(s) 620A and 620B may thus be building blocks of a containerized orchestration engine that facilitates management and execution of software applications in containers. The specific implementations of pod(s) 620A and 620B may vary depending on the specific implementation of the containerized orchestration engine. Container(s) 622A and 622B may be, for example, DOCKER® containers or COREOS® rkt containers, among other possibilities.

Worker nodes 614A and 614B may include proxies 616A and 616B (e.g., "Kube-proxies" in KUBERNETES® terminology), respectively, via which remote user(s) 602 may be able to access software application(s) 624A and 624B, respectively. Proxies 616A and 616B may be configured to proxy user datagram protocol (UDP) and transmission control protocol (TCP) traffic and provide load balancing to worker nodes 614A and 614B, respectively, among other operations. In some implementations, a group of pods may be organized into a service which defines a policy by which to access the group of pods. Each service may be assigned a stable virtual IP address that is exposed outside of computing cluster 604. Proxies 616A and 616B may be configured to access the service into which the group of pods is organized, rather than accessing the pods directly. Thus, software application(s) 624A and 624B may be accessible regardless of changes in the number of pods, changes in the IP addresses of pods, or changes in the distribution of pods among worker nodes 614A and 614B. Additionally, in some embodiments (e.g., environments wherein the containerized application platform 609 is RED HAT® OPENSHIFT®), a route may point to the service under which the group of pods 620A, 620B is organized. The route may include a DNS entry point by which the respective service/underlying pods 620A, 620B can be accessed externally (e.g., by one or more remote user(s) 602 or by the Developer/Operator 600).

Computing cluster 604 may also include master node 606 configured to manage the number, distribution, and scheduling of pods, containers, and/or software applications amongst the plurality of worker nodes (e.g., worker nodes 614A and 614B) within computing cluster 604. Developer/Operator 600 (e.g., developer or operator of software applications 624A and 624B) may be able to communicate with master node 606 by way of application programming interface (API) 608. In some embodiments, API 608 may allow Developer/Operator 600 and/or remote user(s) 602 to interact with a containerized orchestration engine from outside the computing cluster 604. For example, API 608 may allow developer/operator 600 to specify a desired number of copies of software application(s) 624A and/or 624B (i.e., a deployment configuration) to be executed by computing cluster 604 (e.g., to provide a desired quality of service), and to roll out updates to software applications 624A and/or 624B, among other tasks. API 608 may also allow developer/operator 600 to manage other aspects of computing cluster 604, such as various options and settings affecting execution of software application(s) 624A and 624B.

Figure 6B:
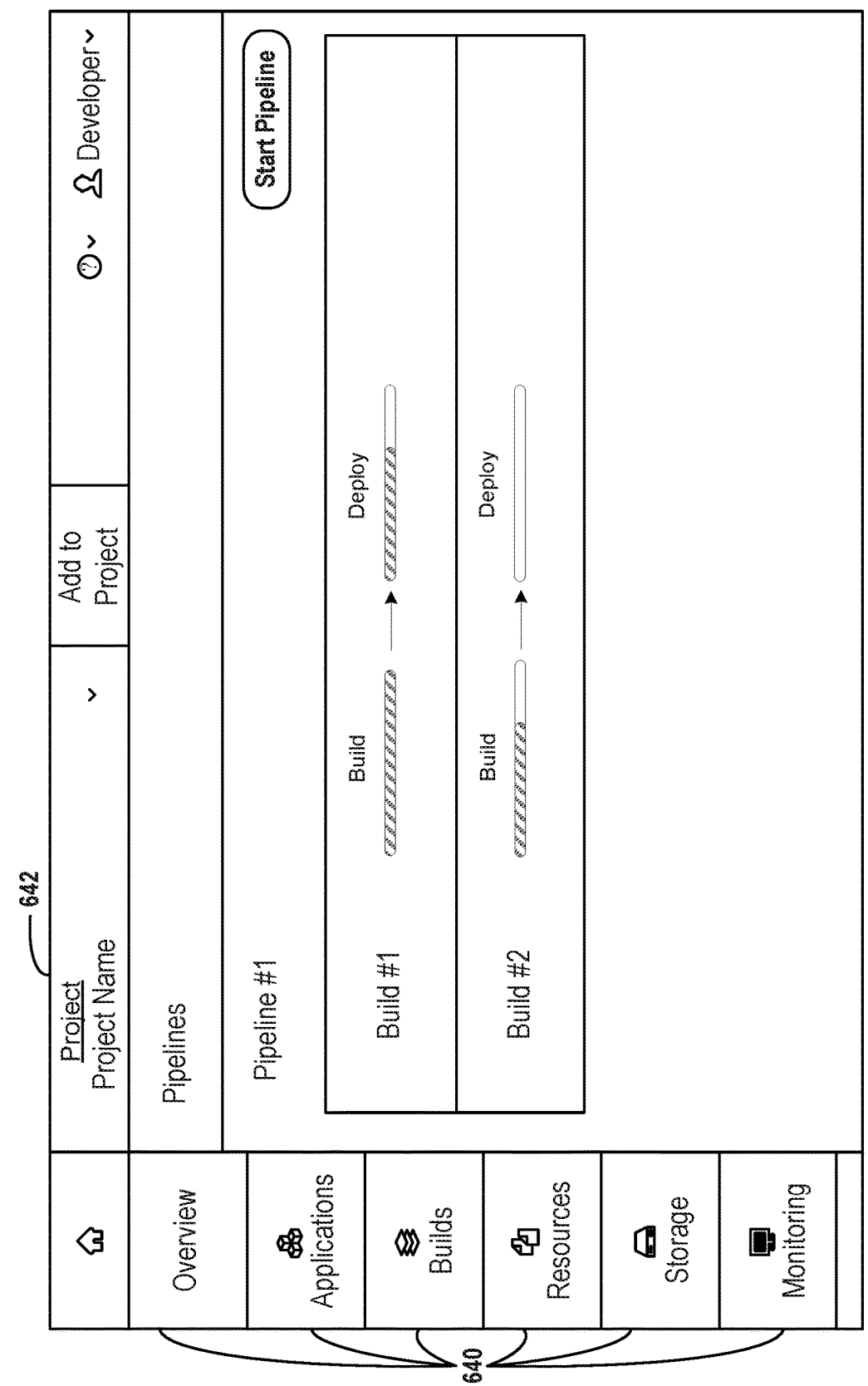
FIG. 6B depicts an example user interface associated with a containerized application platform, in accordance with example embodiments.

Additionally or alternatively, as illustrated, Developer/Operator 600 may use API 608 to communicate with a containerized application platform 609 (e.g., RED HAT® OPENSHIFT®) of the master node 606. The containerized application platform 609 may streamline the management and deployment of containerized applications across the computing cluster 604 (e.g., using the containerized orchestration engine). In some embodiments, when the master node 606 is running a KUBERNETES® containerized orchestration engine and RED HAT® ENTERPRISE LINUX® as the core operating system, the containerized application platform 609 that is installed on the master node 606 may be RED HAT® OPENSHIFT®. The containerized application platform 609 may provide additional layers of security, networking, and/or integration that are not natively present in a baseline containerized orchestration engine (e.g., in KUBERNETES®). In some embodiments, Developer/Operator 600 may be able to manage aspects of the computing cluster 604 using a browser interface (e.g., the RED HAT® OPENSHIFT® web console) in addition to or instead of API 608. For example, FIG. 6B illustrates an example browser interface associated with the containerized application platform 609. Further, the remote user(s) may be able to monitor one or more aspects of the computing cluster 604 using the containerized application platform 609. Which entities within the computing cluster 604, if any, are visible by any given remote user(s) 602 may be set within the containerized application platform 609 by the Developer/ Operator 600.

API 608 may be configured to communicate with node agents 618A and 618B (e.g., "Kubelets" in KUBER-NETES® terminology) on worker nodes 614A and 614B to monitor and control execution of pod(s) 620A and 620B, container(s) 622A and 622B, and/or software application(s) 624A and 624B on worker nodes 614A and 614B, respectively. API 608 may, for example, be configured to communicate with node agents 618A and 618B to initiate execution of containerized software applications 624A and 624B in pod(s) 620A and 620B, respectively, monitor pod(s) 620A and 620B to detect any execution errors, and replace one or more of pod(s) 620A and 620B in response to termination of the one or more of pod(s) 620A and 620B, among other operations. Scheduler and controller manager 610 may be configured to determine the scheduling and distribution of software application(s) 624A and 624B, container 622A and 622B, and pods 620A and 620B among the plurality of worker nodes in computing cluster 604. As described above, API 608 may also allow for interaction between (i) Developer/Operator 600 and/or remote user(s) 602 and (ii) a containerized orchestration engine (e.g., KUBERNETES®) and/or the containerized application platform 609 (e.g., RED HAT® OPENSHIFT®). Additionally, API 608 may be configured to provide information about the containerized application platform 609 and/or the containerized orchestration engine to an external managed network and/or a remote network management platform (as illustrated and described with reference to FIG. 7).

While API 608 is illustrated as a single entity, it is understood that API 608 may include a series of APIs, each with its own corresponding set of queries (e.g., REST queries) to which it can respond. In some embodiments, API 608 may include a combination of APIs associated with both the containerized orchestration engine and the containerized application platform 609. For example, API 608 may include a deployment configuration API, a build configuration API, a route API, a group API, a user API, a project API, an image API, and/or an image stream API, each associated with the containerized application platform 609. Additionally or alternatively, API 608 may include core container API(s), cron job API(s), daemon set API(s), deployment API(s), job API(s), pod API(s), replica set API(s), replication controller API(s), stateful set API(s), endpoint API(s), ingress API(s), service API(s), configuration map API(s), persistent volume API(s), storage class API(s), volume API(s), volume attachment API(s), controller revision API(s), custom resource definition API(s), event API(s), limit range API(s), horizontal pod autoscaler API(s), mutating webhook configuration API(s), validating web-hook configuration API(s), pod template API(s), pod disruption budget API(s), priority class API(s), pod preset API(s), pod security policy API(s), API service API(s), audit sink API(s), binding API(s), certificate signing request API(s), cluster role API(s), cluster role binding API(s), component status API(s), lease API(s), namespace API(s), node API(s), resource quota API(s), role API(s), role binding API(s), runtime class API(s), service account API(s), token request API(s), token review API(s), and/or network policy API(s), each associated with the containerized orchestration engine.

The deployment configuration specified by developer/ operator 600 may be stored in database 612 along with other information that maintains the operational state of computing cluster 604. Database 612 may be implemented as a distributed key-value store (e.g., etcd cluster). In some embodiments (e.g., environments that employ RED HAT® OPENSHIFT®), the deployment configuration may be updated periodically based on an image stream, as described below with reference to FIG. 6B.

The architecture illustrated in FIG. 6A may provide a self-healing mechanism that automatically addresses failure or termination of nodes, pods, containers, and software applications and facilitates ongoing maintenance thereof. Whenever a copy or instance of a software application becomes unavailable due to an unexpected failure or planned termination of the software application, container, pod, or worker node, (or for any other reason) scheduler and controller manager 610 may automatically replace the unavailable copy of the software application with a replacement copy to maintain the desired deployment configuration. Although the replacement may provide the same functionality as the unavailable copy of the software application, the replacement copy might be executed on a different worker node, in a different pod, and/or in a different container, resulting in the replacement copy having different identifying information associated therewith (e.g., different IP address, different TCP or UDP port, different name, etc.).

Each copy of the software application may thus have a finite or ephemeral lifecycle, resulting in a periodically changing distribution of software applications across computing cluster 604. This periodically changing distribution may make conventional discovery and service mapping techniques, which may rely on applications consistently executing on the same physical or virtual machines, unsuitable to this environment. Further, the containerized application platform 609 and the containerized orchestration engine may include a number of interdependencies and objects that interact with one another. However, it may be desirable to identify those objects associated with the containerized application platform 609 in addition to those objects associated with the containerized orchestration engine, which presents additional challenges not addressed by conventional discovery techniques.

As described above, FIG. 6B provides a browser interface or native application associated with the containerized application platform 609 (e.g., the RED HAT® OPENSHIFT® web console). As illustrated, tabs 640 may allow a user (e.g., Developer/Operator 600 or a remote user 602) to monitor/ modify certain aspects of the containerized application platform 609 and/or the associated containerized orchestration engine. For example, as illustrated, the browser interface may provide an overview of the containerized orchestration engine activity, a list of applications running across one or more clusters using the containerized orchestration engine/ containerized application platform 609, various builds associated with the applications, a list of resources (e.g., across one or more clusters) being used to execute the containerized software application(s), a list of storage devices being used to store information about the containerized software application(s) (e.g., application data, source code, one or more builds, etc.), and a monitoring tab used to observe the relative activity of different portions of one or more associated computing cluster(s). As also illustrated in FIG. 6B (e.g., in a primary portion of the browser interface), the browser interface may provide for building and deploying different versions of one or more containerized software applications. Such containerized software applications may be built and deployed using an application pipeline to further streamline developer timelines (e.g., a Jenkins pipeline may be integrated into the containerized application platform 609, allowing an automated process from source code to executable deployment image).

In some embodiments, there may be permissions/credentials required to monitor and/or modify one or more aspects of the containerized application platform 609 and/or the associated containerized application engine. For example, a remote user 602 without adequate permissions may not be able to build/deploy new applications or versions of applications. These permissions may be assigned on the basis of a project 642 within which the associated containerized software application is located. Each project may be associated with one or more groups permitted to access the assets associated with the project. Users within those groups may have the requisite permissions to monitor and/or modify the activity of the containerized orchestration engine using the containerized application platform 609. For instance, a group of developers may have the credentials to build and deploy new executable images for a given containerized software application using the containerized application platform 609, whereas a group of operators may have the credentials to monitor/rebalance the activity associated with the containerized software application. Credentials may be assigned on a group by group basis or, in some embodiments, on a user by user basis (e.g., to provide more granularity). Each project may be associated with one or more groups and, thereby, with one or more users. Oppositely, each group may be associated with multiple projects and each user may also be associated with multiple projects and/or multiple groups. As illustrated in FIG. 6B, the user "Developer" may be able to select the project 642 from the list of the projects with which the user "Developer" is associated.

Figure 6C:
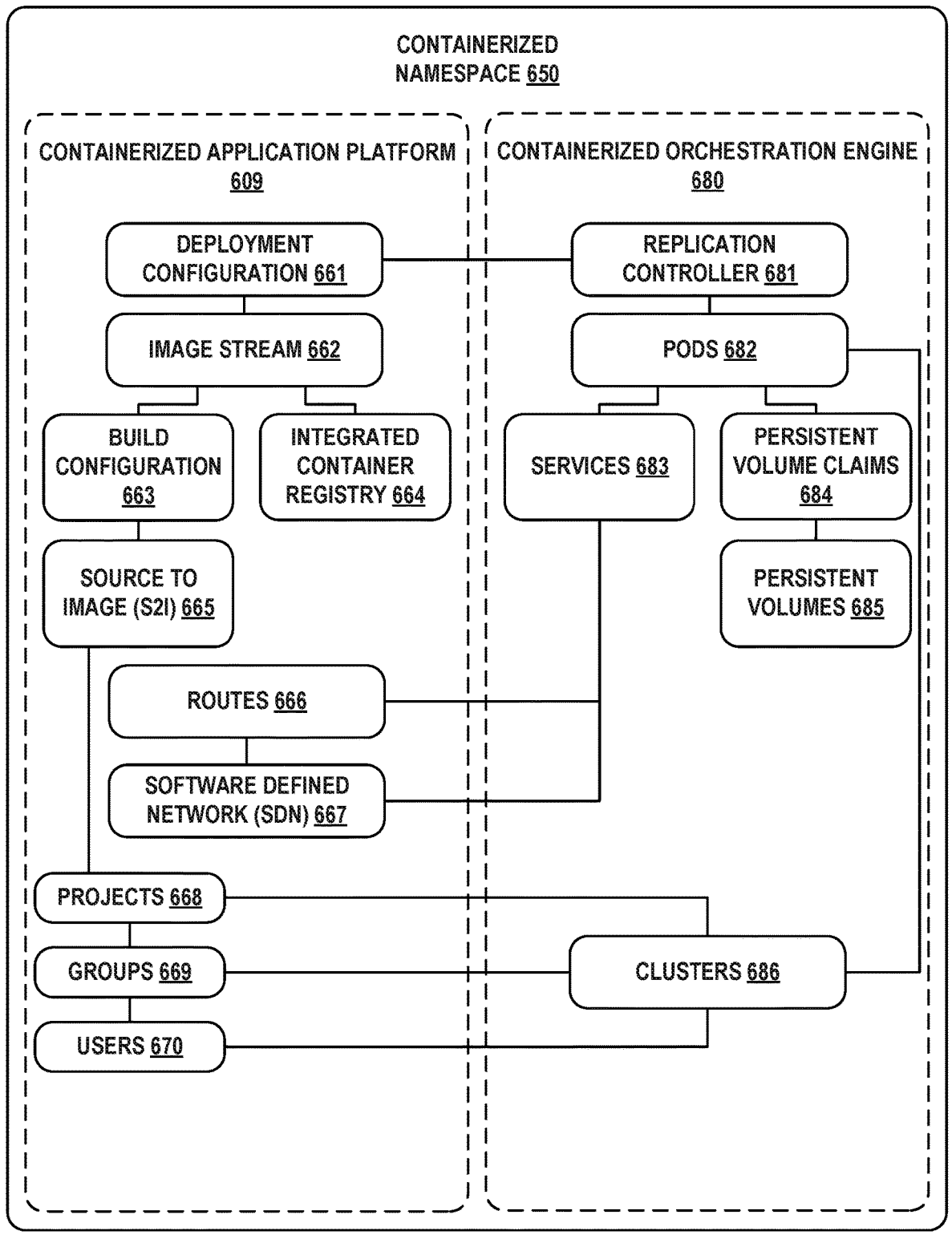
FIG. 6C depicts a namespace object used within a containerized software environment, in accordance with example embodiments.

FIG. 6C illustrates a containerized namespace 650 using within a containerized software environment. The containerized namespace 650 may be associated with both the containerized application platform 609 and a containerized orchestration engine 680. The containerized namespace 650 may be an object (e.g., defined in an object-oriented programming language used to develop/distribute the containerized orchestration engine 680 and containerized application platform 609, such as a JavaScript Object Notation (JSON) object) with which each of the containerized application platform 609 objects, each of the containerized orchestration engine 680 objects, and/or objects used in the containerized software applications are tethered. Further, the containerized namespace 650 may be associated with a particular containerized software application. For example, as illustrated, the containerized namespace 650 may include one or more objects of the containerized application platform 609 and, similarly, one or more objects of the containerized orchestration engine 680. As illustrated, the containerized application platform 609 may include the following objects: a deployment configuration 661, an image stream 662, a build configuration 663, an integrated container registry 664, a source to image (S2I) 665, one or more routes 666, a software defined network (SDN) 667, one or more projects 668, one or more groups 669, and one or more users 670. In addition, as illustrated, the containerized application platform 680 may include the following objects: a replication controller 681, one or more pods 682, one or more services 683, one or more persistent volume claims 684, one or more persistent volumes 685, and one or more clusters 686.

Each of the objects illustrated in FIG. 6C performs a particular function with respect to generating/deploying pods 682 across one or more clusters 686 to execute a containerized software application and/or to monitor the deployment, generation, and execution of the containerized software application. The pods 682 may be deployed across one or more nodes (e.g., by making one or more persistent volume claims 684) and, thereby, may have access to the respective node resources (e.g., the persistent volumes 685 associated with the respective nodes). The pods 682 may also be accessible internally (e.g., by other objects within the containerized namespace 650) using one or more services 683. Such services 683 may be linked to one or more routes 666 within the containerized application platform 609. The routes 666 may make the services 683 and, thereby, the underlying pods 682 accessible externally. For example, each route 666 may provide an external DNS entry that points to a respective service 683.

The pods 682 may also be linked to the replication controller 681, as illustrated. The pods 682 may be managed by the replication controller 681. For example, the replication controller 681 may maintain a specified number of copies of a given pod 682 running within a cluster 686. If one of the copies of the pod 682 crashes or is deleted, the replication controller 681 may spin-up a new pod 682 as a replacement. The replacement pod 682 may be created, deployed, and/or managed according to the deployment configuration 661 of the containerized application platform 609. The deployment configuration 661 may be a single microservice that defines a deployment template that can be used to create/deploy new pods 682. The deployment template may be used to deploy executable images (including portions thereof) of one or more containerized software applications across the one or more pods 682. The executable images may be retrieved from the image stream 662 of the containerized application platform 609. As illustrated, the executable images in the image stream 662 can be generated using the build configuration 663 (e.g., fed by the source to image (S2I) 665) and/or the integrated container registry 664.

The build configuration 663 may provide a build template by which executable images of one or more containerized software applications can be built from source code within the containerized application platform 609. In some embodiments, the build configuration 663 may generate a new executable image by combining a user-generated source code with a base image (e.g., a builder image used for a specific programming language, such as Java, Python, Ruby, PHP, etc.). For example, the user-generated source code may be created by a software developer and stored within a repository (e.g., a Git repository). Next, the S2I 665 may download the base image from a base-image repository, clone the Git repository where the user-generated source code is located, use the build configuration 663 to combine the base image with the user-generated source code, and generate a new container-registry image (e.g., DOCKER® image) that contains the combination. The combined combination may be deployed to the one or more pods via the deployment configuration 661 and replication controller 681 and/or may be stored in the integrated container registry 664 of the containerized application platform 609 for later use. The foregoing technique for generating executable images may allow a developer to make a change to the source code of a containerized software application and propagate the change to the pods 682 in an efficient manner (e.g., because the build configuration 663 may by updated automatically as a result of a source code modification being made/propagated to the S2I 665).

Additionally or alternatively, the image stream 662 may receive an executable image from the integrated container registry 664 (e.g., by tracking updates based on the build configuration 663). The integrated container registry 664 may include previously stored executable images created by the build configuration 663 and/or standardized container builds (e.g., a DOCKER®-based build that stems from a DOCKER® file). Whether to generate a new executable image using the build configuration 663 and the S2I 665 or to retrieve a preexisting executable image from the integrated container registry 664 may be determined by the deployment configuration 661.

As indicated above, the S2I 665 may be provided with user-generated source code such that the build configuration can generate new executable images. The user-generated source code may be provided by the Developer/Operator 600, for example. Further the Developer/Operator 600 may be one of the users 670 of the containerized application platform 609. As such, the Developer/Operator 600 may be associated with one of the groups 669, which itself is associated with one of the projects 668. The users 670, groups 669, and projects 668 may also each be associated with one or more clusters 686 (e.g., an object that describes the computing cluster 604 illustrated in FIG. 6A) used by the containerized orchestration engine 680 to execute the containerized software applications. Any user-generated source code may be stored within a source-code repository associated with the respective project 668 such that the user-generated source code is retrievable by the S2I 665 and, thereby, the build configuration 663. The build configuration 663 may, for example, be tied to base images (e.g., builder images) and/or source code (e.g., user-generated source code) using one or more web-hooks. The web-hooks may allow the build configuration 663 to determine when one or more of the users' projects 668 is updated with new source code.

There may be one or more APIs within the containerized application platform 609 that allow one or more of the objects within the containerized namespace 650 of FIG. 6C to be accessed, as described above with respect to API 608 of FIG. 6A. Such APIs may be REST APIs that can be queried to identify one or more objects within the containerized namespace 650 of FIG. 6C associated with the containerized application platform 609. As such, the APIs may relate to one or more of the following entities within the containerized namespace 650 and containerized application platform 609 of FIG. 6C: the deployment configuration 661, the image stream 662, the build configuration 663, the integrated container registry 664, the S2I 665, the routes 666, the SDN 667, the projects 668, the groups 669, and the users 670.

Similarly, there may be one or more APIs within the containerized orchestration engine that allow one or more of the objects within the containerized orchestration engine 680 to be accessed, as described above with respect to API 608 of FIG. 6A. Such APIs may be REST APIs that can be queried to identify one or more objects within the containerized namespace 650 of FIG. 6C associated with the containerized orchestration engine 680. As such, the APIs may relate to one or more of the following entities within the containerized namespace 650 and containerized orchestration engine 680 of FIG. 6C: the replication controller 681, the pods 682, the services 683, the persistent volume claims 684, the persistent volumes 685, and the cluster 686.

Embodiments described herein may identify one or more objects associated with the containerized application platform 609. One technique to identify such containerized application platform objects may be to first identify one or more objects associated with the containerized orchestration engine 680 (e.g., by querying one or more APIs associated with the containerized orchestration engine 680). Thereafter, the identified containerized orchestration engine object(s) may be inspected to identify the underlying containerized namespace 650 of the identified containerized orchestration engine object(s). Using the underlying containerized namespace 650, objects associated with the containerized application platform 609 may be identified (e.g., using one or more corresponding APIs) based on whether they include the containerized namespace 650 (i.e., whether the share the containerized namespace 650 with the containerized orchestration engine 680). For example, those objects that are associated with the containerized application platform 609 but do not include the containerized namespace 650 may be retrieved and consequently discarded, in some embodiments.

VII. EXAMPLE ARCHITECTURE FOR MAPPING OF EPHEMERAL SOFTWARE APPLICATIONS

Figure 7:
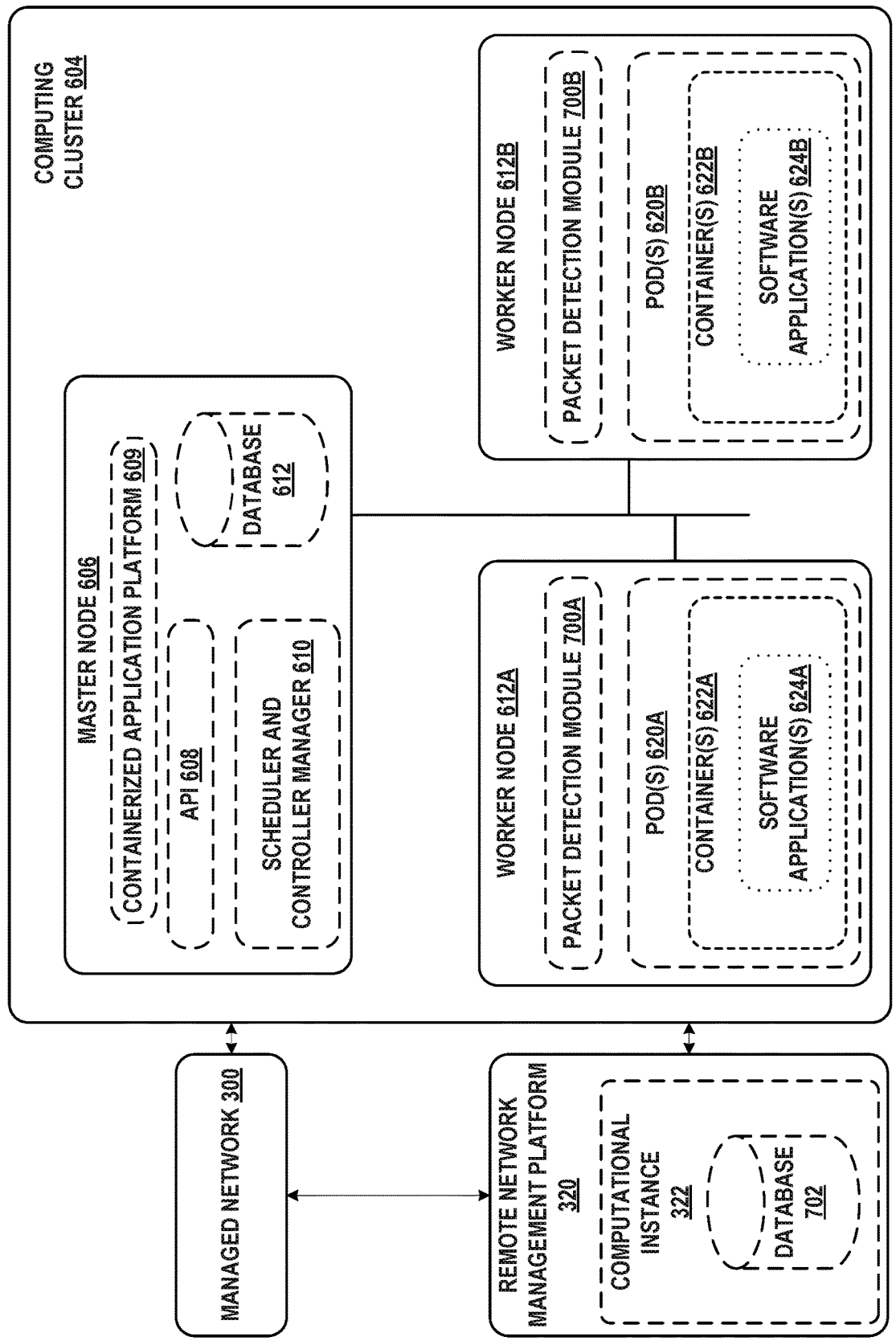
FIG. 7 depicts a distribution of packet detection modules, in accordance with example embodiments.

FIG. 7 illustrates an example system for discovery and mapping of ephemeral software applications executing on a platform for hosting containerized software applications. Specifically, FIG. 7 illustrates remote network management platform 320, managed network 300, and computing cluster 604 in a communicative relationship. Computing cluster 604 may be configured to execute containerized software applications 624A and 624B on behalf of managed network 300. As discussed with respect to FIG. 6A, software application(s) 624A and 624B may be executed in container(s) 622A and 622B, respectively, which may in turn be organized into pod(s) 620A and 620B, respectively. Notably, computing cluster 604 may be part of a third-party computing system different from managed network 300 or remote network management platform 320. Nevertheless, in some implementations, computing cluster 604 may form part of managed network 300 or remote network management platform 320 and may be collocated therewith.

In order to map the distribution of software application(s) 624A and 624B, container(s) 622A and 622B, and/or pod(s) 620A and 620B across the worker nodes (e.g., worker nodes 612A and 612B) available in computing cluster 604, each worker node may include thereon a corresponding packet detection module. Thus, worker node 612A may include thereon packet detection module 700A and worker node 612B may include thereon packet detection module 700B. Notably, worker nodes 612A and 612B illustrated in FIG. 7 may additionally include thereon the components shown and discussed with respect to FIG. 6A, as well as other components of a containerized orchestration engine not shown herein.

Packet detection modules 700A and 700B may be configured to monitor network traffic between the containerized software applications executing on computing cluster 604. Thus, packet detection modules 700A and 700B may also be referred to as "traffic sniffers." In some implementations, a packet detection module may be included within each of pod(s) 620A and 620B and may monitor network traffic at the pod level rather than at the worker node level. Packet detection modules 700A and 700B may be configured to monitor the network traffic, including TCP and UDP traffic, at a network interface module of worker nodes 612A and 612B, respectively. Packet detection modules 700A and 700B may be able to disambiguate worker nodes 612A and 612B, pod(s) 620A and 620B, and container(s) 622A and 622B based on IP addresses and TCP or UDP ports assigned to applications using these IP addresses. API 608 may be used to access a list of these IP addresses and active ports per IP address, which may be tracked by master node 606.

Packet detection modules 700A and 700B may also be configured to generate and store traffic data representing the monitored network traffic. In some implementations, the traffic data may include a log of all network traffic experienced by the network interface modules of worker nodes 612A and 612B. Alternatively, packet detection modules 700A and 700B may apply a filter to the monitored network traffic. That is, packet detection modules 700A and 700B may be configured to monitor all network traffic, but might store within the traffic data only a portion of the monitored network traffic that meets certain criteria.

Packet detection modules 700A and 700B may, for example, store only traffic data representing TCP SYN packets exchanged between the plurality of worker nodes and the pods, or containers thereon. By tracking only TCP SYN packets, packet detection modules 700A and 700B may generate traffic data that identifies communicative relationships between the different components of computing cluster 604 while avoiding generation of excess traffic data that provides only redundant information (e.g., data exchanged over TCP connections established in response to the TCP SYN packets).

The data stored by packet detection modules 700A and 700B may include, for example, the source IP address, destination IP address, source TCP port, and destination TCP port of each of the TCP SYN packets. In this way, the source IP address, possibly in combination with the source TCP port, can be used to identify the initiating application of the connection. Likewise, the destination IP address, possibly in combination with the destination TCP port, can be used to identify the receiving application of the connection. The detection of a TCP SYN packet transmitted from a particular source to a particular destination is indicative of a relationship between the software applications identified by the respective IP addresses and/or port numbers. The strength of this relationship may be estimated by the number of such TCP SYN packets detected over a unit of time (e.g., a one minute, one hour, one day, etc.).

A relationship's strength may vary over time based on network usage patterns. Thus, for an application with usage that follows a daily cycle, the strength of the relationship as reflected by the detected packets may increase in the morning, hold relatively steady in the afternoon, and then decrease in the evening. Also, this mechanism allows stale relationships (relationships that were previously valid but are no longer valid) to be timed out. For instance, if packets indicative of a particular relationship are not detected for a period of time (e.g., an hour, six hours, a day, etc.), this relationship may be considered to be no longer in operation and any visually representation thereof may be removed from the service mapping display.

Packet detection modules 700A and 700B may nevertheless also store traffic data indicative of the extent of data transmitted (i.e., the throughput) between software application(s) 624A and 624B, container(s) 622A and 622B, pod(s) 620A and 620B, and worker nodes 612A and 612B to quantify the strength or intensity of the communicative relationships therebetween. That is, the traffic data may be used not only to determine, for example, that two pods are configured to communicate with one another, but also to determine how extensively (e.g., in terms of frequency and/or amount of data) the two pods communicate. The extent of data transmitted may be determined by packet detection modules 700A and 700B by counting the detected bytes of the connection between the two pods, or determining this value by comparing the sequence number of the TCP SYN packet that initiated the connection with the sequence number of a TCP FIN packet that terminates the connection.

The mapping of the distribution of software application(s) 624A and 624B, container(s) 620A and 620B, and/or pod(s) 620A and 620B across the worker nodes (e.g., worker nodes 612A and 612B) available in computing cluster 604 may be further facilitated by configuration data provided by API 608. Database 612 of master node 606 may store the configuration data representing a current arrangement of worker nodes, pods, containers, and software applications within computing cluster 604. The configuration data may additionally identify other components of the containerized orchestration engine (e.g., KUBERNETES®) operating on computing cluster 604, including volumes (i.e., persistent storage within a pod), overlay networks, daemon sets, resource sets, cron jobs, and processes that make up a given software application, among other components. API 608 may provide a mechanism for accessing this data by way of a computing device within managed network 300, a computing device within remote network management platform 320, or a computing device within computing cluster 604, among other possibilities. API 608 might not, however, provide data indicative of the communicative relationships between the worker nodes, pods, containers, software applications, and/or other components of the containerized orchestration engine executing on computing cluster 604.

The configuration data may be used in combination with the traffic data generated by packet detection modules 700A and 700B to generate mappings between containerized software applications that have communicative relationships therebetween. Specifically, the traffic data may be parsed for patterns indicative of communicative relationships between the containerized software applications identified by the configuration data. The traffic data may also be used to identify communicative relationships between other components of the containerized orchestration engine that have been identified by the configuration data. Without the configuration data provided by API 608, the identities of the modules using the different IP addresses between which network traffic is monitored might not be known.

Notably, since a containerized software application (e.g., software application(s) 624A and 624B) may be ephemeral, the IP address of the pod in which it is executing, as well as the container in which it is executing, may change as the containerized software application is redistributed across different pods or worker nodes. Thus, the traffic data alone might be insufficient to keep track of the distribution of containerized software applications since the identities of the software applications assigned particular addresses are unknown from the traffic data alone. The configuration data may allow for identification of the containerized software applications corresponding to the different IP addresses and ports thereof among which network traffic is exchanged over time. The combination of traffic data and configuration data may thus allow for identification of the resources in computing cluster 604 (using the configuration data) as well as the communicative relationships therebetween (using the traffic data).

Parsing the traffic data for patterns indicative of communicative relationships between the containerized software applications may involve determining that a first containerized software application identified by the configuration data has requested to establish a connection, has established a connection, or is exchanging data with a second containerized software application identified by the configuration data. Additionally, parsing the traffic data for patterns may involve determining that one or more packets of a given type are exchanged between addresses corresponding to the first and second containerized software applications at a time when the first and second containerized software applications are assigned these addresses. That is, the parsing process may verify that the addresses were in fact used to exchange data between the first and second applications, rather than some other applications assigned the same addresses at an earlier or later point in time. To that end, the configuration data as well as the traffic data may be time-stamped to facilitate such verification.

When one or more patterns indicative of communicative relationships between the containerized software applications are identified, mappings may be generated between the containerized software applications that have communicative relationships therebetween. The mappings may be stored in a database (e.g., stored by computational instance 322 in database 702) along with the configuration data. For example, the mappings may be stored as configuration items in CMDB 500 (thus, database 702 and CMDB 500 may be the same database or different databases). The mappings may also be expressed as a graph, with each node of the graph representing a containerized software application and each link between the nodes representing a communicative relationship. To that end, the database may store therein a definition of the graph.

In addition, the database 702 may be configured to store information discovered about the containerized application platform 609 and/or information used to perform discovery of the containerized application platform 609. For example, the database 702 may include a credential repository associated with the containerized application platform 609. The credential repository may store credentials used by a computing device (e.g., within the remote network management platform 320) to obtain permission to access a deployment configuration API and/or a build configuration API (e.g., one or both being part of API 608). In some embodiments, one or more of the credentials stored within the credential repository may be associated with one or more projects 668, one or more groups 669, and/or one or more users 670 of the containerized application platform 609 (e.g., a username and password used by one of the users 670 to log in to the containerized application platform 609). Such credentials may be retrieved from a user device (e.g., by a computing device of the remote network management platform 320 requesting and receiving authentication from a computing device used by the user 670 and/or located within the managed network 300).

Additionally or alternatively, the database 702 may be configured to store one or more relationships between objects in the containerized orchestration engine 680 and/or the containerized application platform 609. For example, the database 702 may store one or more relationships between deployment configuration data associated with the deployment configuration 661 of the containerized application platform 609 and one or more objects of the containerized orchestration engine 680 (e.g., the replication controller 681, one or more of the pods 682, one or more of the services 683, etc.). Additionally or alternatively, the database 702 may store one or more relationships between build configuration data associated with the build configuration 663 of the containerized application platform 609 and one or more objects of the containerized orchestration engine 680 (e.g., the replication controller 681, one or more of the pods 682, one or more of the services 683, etc.). Still further, the database may be configured to store one or more relationships internal to the containerized application platform 609 (i.e., how one or more objects within the containerized application platform 609 are related to one another) and/or one or more relationships internal to the containerized orchestration engine 680 (i.e., how one or more objects within the containerized orchestration engine 680 are related to one another).

The mapping operations described above may be carried out by, for example, a computing device within managed network 300, a computing device within remote network management platform 320, a computing device within computing cluster 604, or a combination thereof, among other possibilities. For example, computing cluster 604 may be configured to execute containerized applications on behalf of managed network 300 while computational instance 322 within remote network management platform 320 may be configured to monitor the distribution of software applications, containers, pods, and worker nodes within computing cluster 604 on behalf of managed network 300. Computational instance 322 may also be configured to, based on the monitoring, provide a way to access and visualize the monitored distribution, thereby allowing users of managed network 300 to better understand how computing cluster 604 operates.

Additionally, the computing device may be configured to periodically repeat the operations described above to track a history of changes in the distribution of resources in computing cluster 604. Specifically, the computing device may be configured to periodically access the configuration data via API 608 and access the traffic data from packet detection modules 700A and 700B to keep track of the distribution and communicative relationships between software application(s) 624A and 624B, container(s) 622A and 622B, pod(s) 620A and 620B, and worker nodes 612A and 612B over time.

VIII. EXAMPLE OPERATIONS FOR MAPPING OF EPHEMERAL SOFTWARE APPLICATIONS

Figure 8A:
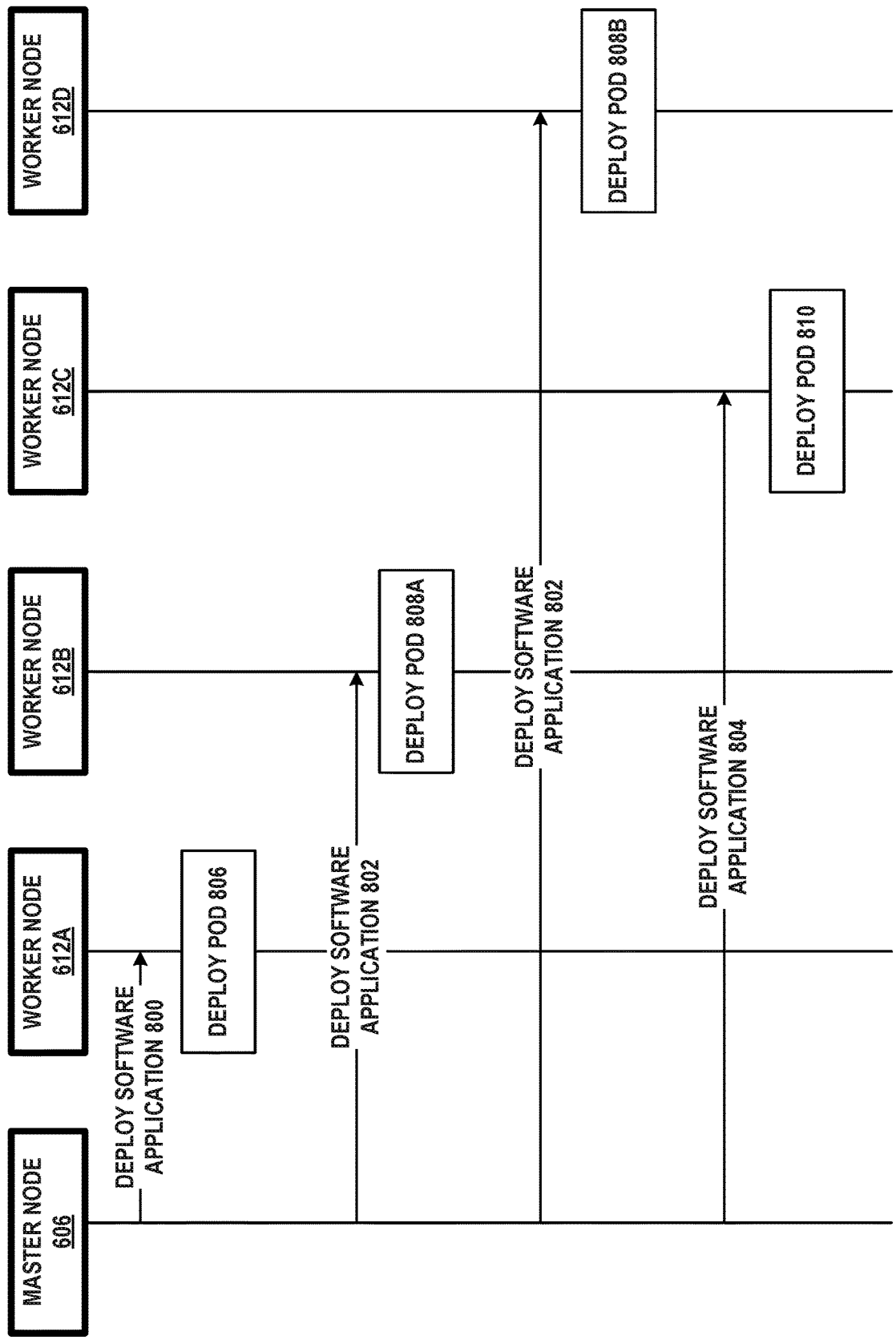
FIG. 8A depicts a message diagram related to deployment of containerized software applications, in accordance with example embodiments.

FIG. 8A illustrates an example deployment process for containerized software applications. Developer/operator 600 may specify a desired deployment of containerized software applications. For example, developer/operator 600 may specify that computing cluster 604 should execute one pod with containerized software application 800, two pods with containerized software application 802, and one pod with containerized software application 804. For example, containerized software application 800 may be a user-facing front-end of a web-based application, while containerized software applications 802 and 804 may be back-ends that provide some of the functionality (e.g., image processing, mathematical calculations, database management, etc.) exposed via front-end software application 800.

Software application 802 may take longer to run, may perform a more computationally intensive task, and/or may be invoked more frequently than software applications 800 or 804. Thus, two pods are allocated for software application 802, while only one pod is allocated for each of software applications 800 and 804. However, other factors may also drive the number of pods allocated to a given software application. In some cases, the number of pods for each application may be automatically scaled based on demand.

In response to receiving this indication of the desired number of pods for each of containerized software applications 800, 802, and 804, master node 606 may be configured to determine a distribution of the desired number of pods across worker nodes 612A, 612B, 612C, and 612D and provide instructions thereto to initiate execution of the desired number of pods. Thus, master node 606 may instruct (i) worker node 612A to execute on pod 806 containerized software application 800, (ii) worker node 612B to execute on pod 808A containerized software application 802, (iii) worker node 612D to execute on pod 808B containerized software application 802, (iv) and worker node 612C to execute on pod 810 containerized software application 804. The distribution may be based on, for example, the amount of computational resources available on each of worker nodes 612A, 612B, 612C, and 612D and the amount of computational resources expected to be utilized by each of the pods, among other factors.

Figure 8B:
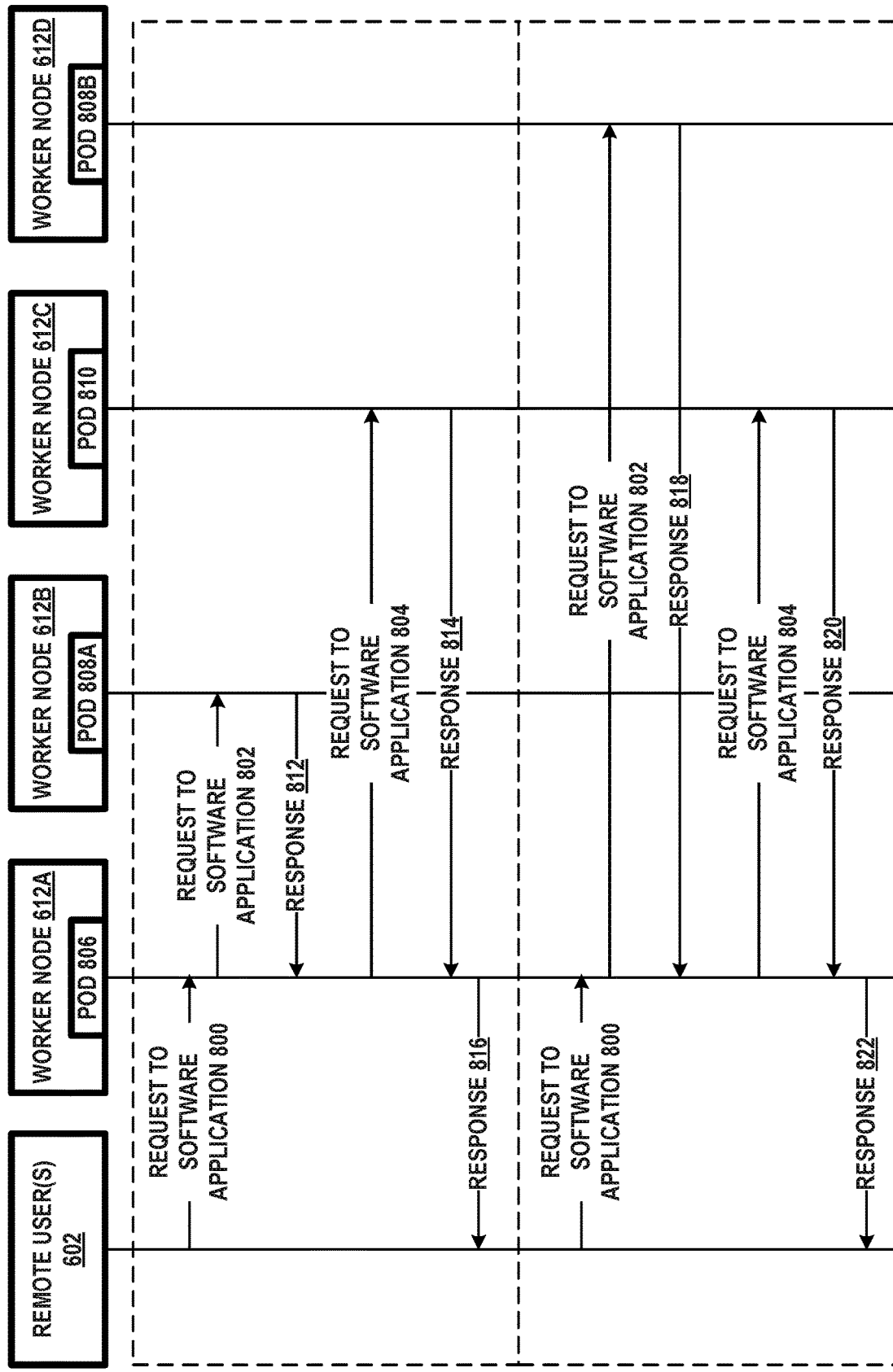
FIG. 8B depicts a message diagram related to deployment of containerized software applications, in accordance with example embodiments.

Once software applications 800, 802, and 804 are deployed in pods 806, 808A, 808B, and 810, the software applications may be configured to receive traffic from and provide service to remote user(s) 602, as illustrated in FIG. 8B. For example, a first user of remote user(s) 602 may transmit a first request to the web service made up of application 800, 802, and 804. The first request may be handled by front-end software application 800 executing in pod 806. Pod 806 may, in response, transmit a second request to software application 802 executing in pod 808A. In response to receiving the second request, software application 802 executing in pod 808A may process the second request and provide a corresponding response 812 (e.g., a processed image, a confirmation of a successful database modification, etc.). Notably, the second request could alternatively be transmitted to pod 808B, as described below, which is also configured to execute software application 802. Requests to software application 802 may thus be load balanced between pods 808A and 808B.

Pod 806 may also transmit a third request to software application 804 executing in pod 810. In response to the third request, software application 804 executing in pod 810 may process the request and provide a corresponding response 814. Software application 800 may then provide response 816 to the first user, which may be based on responses 812 and 814.

The network traffic between the first user, pod 806, pod 808A, and pod 810 may be monitored by packet detection modules disposed on worker nodes 612A, 612B, and 612C to generate and store traffic data indicative of communicative relationships between software applications 800, 802, and 804, their containers, pods, and/or worker nodes. Each transmission may be timestamped to allow for monitoring of the communicative relationships over time. The communicative relationships between pods 806, 808A, 808B, and 810 (and therefore applications 800, 802, and 804) may thus be determine based on data acquired during execution thereof, without reliance on prior knowledge of the structure and relationships between software application 800, 802, and 804. Notably, additional monitoring of network traffic may be needed to uncover any communicative relationships of pod 808B with pods 806, 808A, 810.

Thus, second user of remote user(s) 602 may transmit a fourth request to the web service made up of application 800, 802, and 804, which may be handled by front-end software application 800 executing in pod 806. Pod 806 may, in response, transmit a fifth request to software application 802 executing in pod 808B. Notably, this time the request from pod 806 to application 802 may be load balanced to pod 808B rather than 808A. In response to receiving the fifth request, software application 802 executing in pod 808B may process the fifth request and provide a corresponding response 818. Pod 806 may also transmit a sixth request to software application 804 executing in pod 810. In response to the sixth request, software application 804 executing in pod 810 may process the request and provide a corresponding response 820. Software application 800 may then provide response 822 to the first user, which may be based on responses 818 and 820.

The network traffic between the second user, pod 806, pod 808B, and pod 810 may again be monitored by packet detection modules disposed on worker nodes 612A, 612C, and 612D to generate and store traffic data indicative of communicative relationships. Again, each transmission may be timestamped to allow for monitoring of the communicative relationships over time. The traffic data may be used in combination with configuration data from API 608 to map the distribution and communicative relationships of software applications 800, 802, and 804, any containers therefor, and pods 806, 808A, 808B, and 810 among worker nodes 612A, 612B, 612C, and 612D.

For example, a computing device disposed within managed network 300, within remote network management platform 320, or within computing cluster 604 may request configuration data from API 608. The configuration data may indicate that application 800 is executing in pod 806 on worker node 612A, a first copy of application 802 is executing in pod 808A on worker node 612B, a second copy of application 802 is executing in pod 808B on worker node 612D, and application 804 is executing in pod 810 on worker node 612C. The computing device may also request and receive, from each of the packet detection modules executing on worker nodes 612A, 612B, 612C, and 612D, traffic data corresponding to any connections that have been established between pods 806, 808A, 808B, and 810.

The traffic data may be parsed by the computing device for patterns indicative of communicative relationships between pods 806, 808A, 808B, and 810 (and thus applications 800, 802, and 804 as well as the containers in which these application are executed). The computing device may also generate mappings between any pods (and thus any containers and applications) that have communicative relationships therebetween. The generated mappings may be organized into a graph that can be displayed on a user interface to allow a user to visualize the distribution of software applications 800, 802, and 804 among the nodes of computing cluster 604.

Figure 9A:
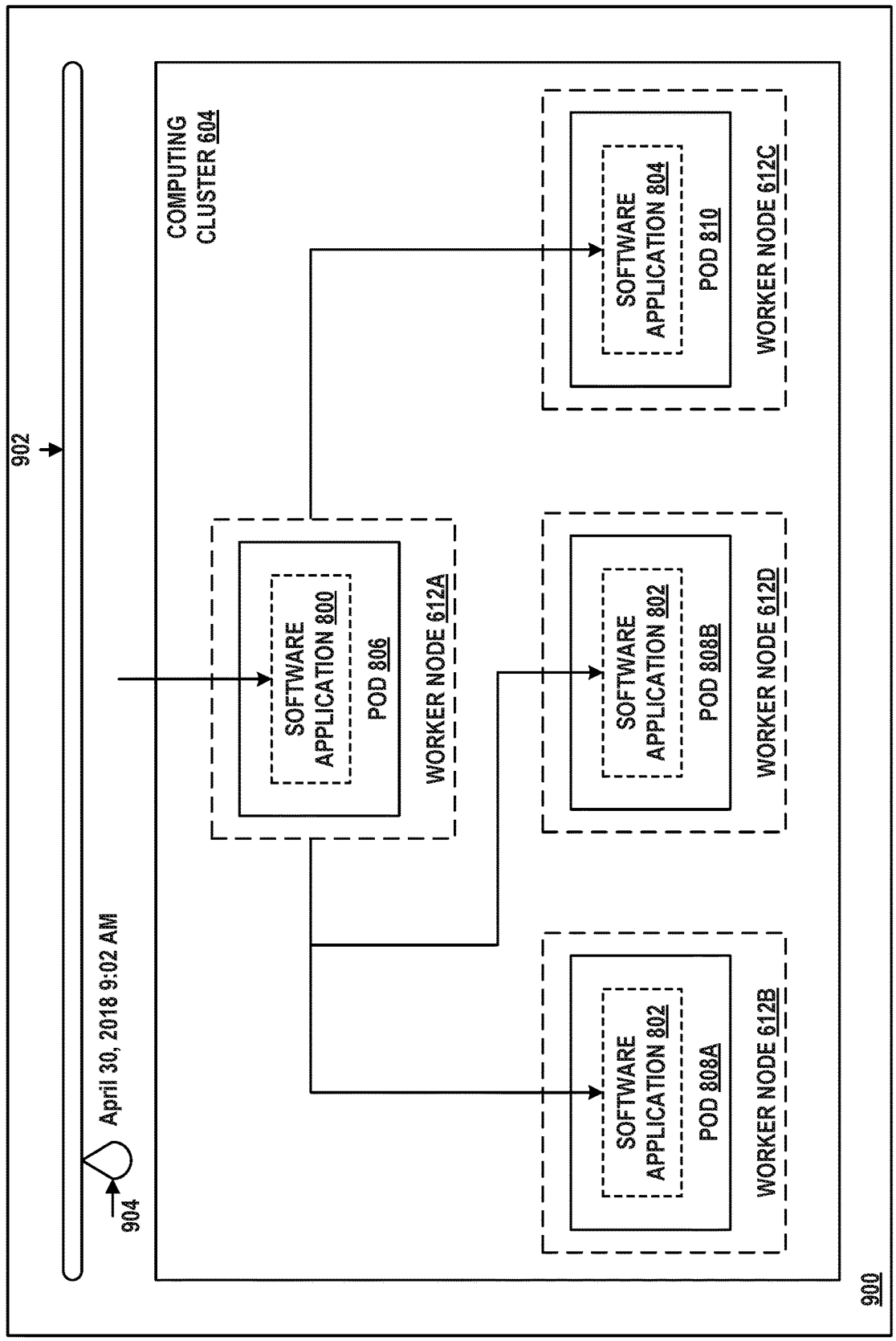
FIGS. 9A and 9B depict a graphical user interface displaying a mapping of containerized software applications, in accordance with example embodiments.

FIG. 9A illustrates graphical user interface 900 that shows the mapping between pods 806, 808A, 808B, and 810. Namely, FIG. 9A shows that requests from remote user(s) 602 are handled by software application 800 executing in pod 806 on worker node 612A. Pod 806, in turn, communicates with software application 802, executing in pods 808A and 808B on worker nodes 612B and 612D, respectively, and with software application 804 executing in pod 810 on worker node 612C. Pods 808A, 808B, and 810 (or the applications therein) do not communicate directly with one another in this example. Such visual mapping of the communicative relationships may be helpful where the structure and relationships of software applications 800, 802, and 804 are not known to the user or entity utilizing the service mapping. For example, the mapping may allow remote network management platform 320 to automatically keep track of the state of any ephemeral containerized software applications executing on behalf of managed network 300 by computing cluster 604 without having prior information (e.g., the source code) about the containerized software application.

User interface 900 may additionally include timeline 902, cursor 904 indicating a time point along the timeline 902 at which the state of computing cluster 604 is shown, and the date and time corresponding to the time point (e.g., Apr. 30, 2018 9:02 AM). Cursor 904 may be repositioned along timeline 902 by interacting with user interface 900 to show the distribution of software applications 800, 802, and 804 across computing cluster 604 at different points in time. In one example, the mapping shown in user interface 900 may be stored in a database by the computing device as a graph, with worker node, pod, and software application represented as nodes or hierarchical sub-nodes, and each communicative relationship represented as a link between corresponding nodes or sub-nodes.

When displayed on user interface 900, the nodes of the graph may be interactive, allowing for the level within the hierarchy represented by each node to be modified. For example, a node representing a pod may be clicked or otherwise selected to view the containerized software applications executing therein. Further, the containerized software applications may be selected to view the different processes that make up the software application.

The distribution of software applications, containers, and pods across worker nodes 612A, 612B, 612C, and 612D may change from time to time as worker nodes, pods, and/or containers terminate their operation due to planned or unplanned causes. The computing device may thus periodically repeat the operations discussed above to identify any new distributions over time.

Figure 8C:
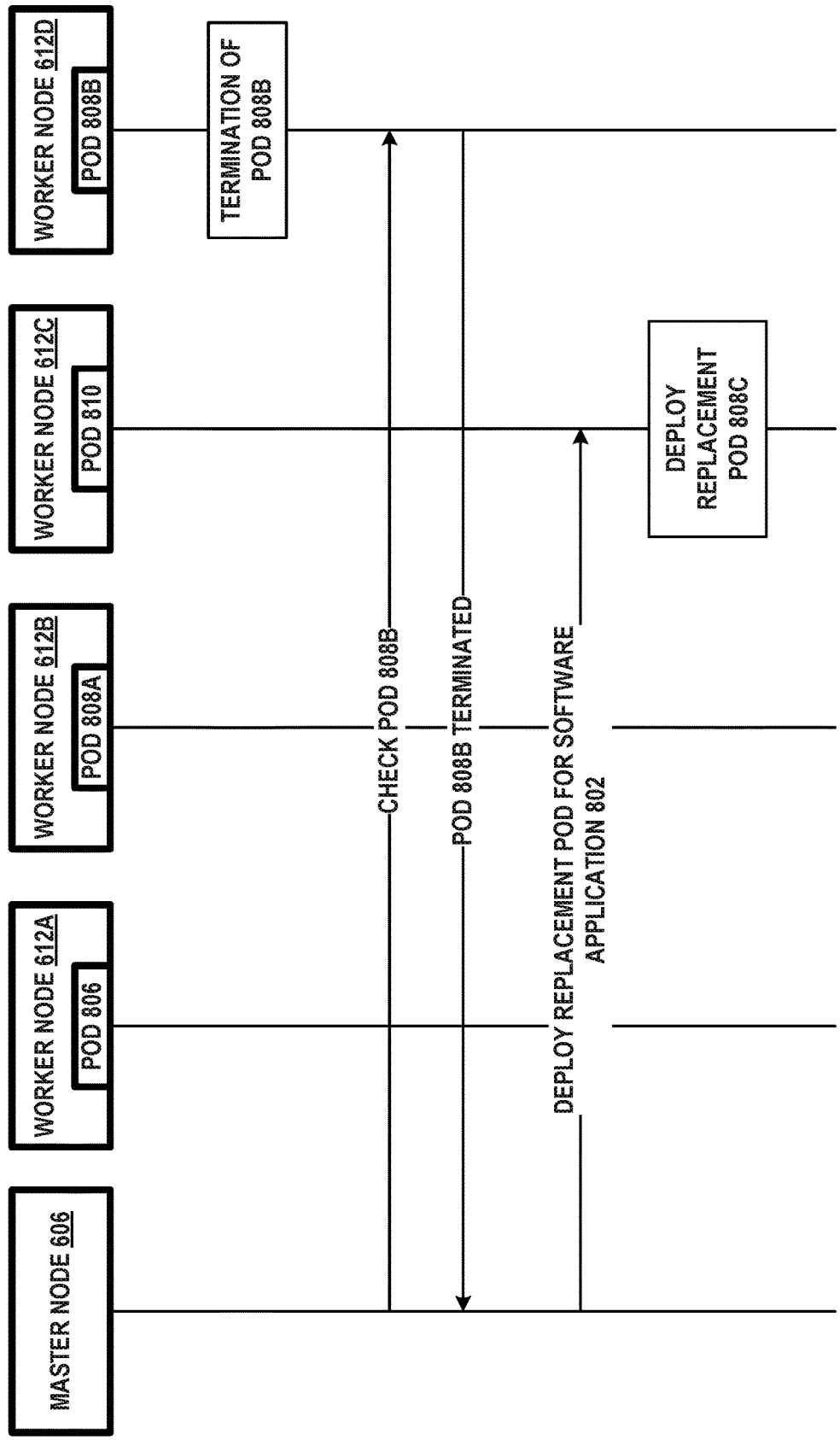
FIG. 8C depicts a message diagram related to deployment of containerized software applications, in accordance with example embodiments.

To that point, FIG. 8C illustrates termination and replacement of a pod. Namely, pod 808B on worker node 612D may terminate. For example, the termination may be scheduled by scheduler and controller manager 610 of master node 606 to allow for reassignment of computing resources. Alternatively, the termination may be caused by an error during execution of pod 808B or software application 802 therein, or by failure of node 612D, among other possible causes. Master node 606 may periodically poll worker node 612D to determine the state of the pods executing thereon. After termination of pod 808B, master node may determine that pod 808B is no longer executing on worker node 612D and, in response, may deploy a replacement pod for software application 802 to one of the other worker nodes in computing cluster 604. FIG. 8C shows master node deploying replacement pod 808C to worker node 612C. In some implementations, master node 606 may identify termination of pod 808B in other ways such as, for example, by receiving a signal from the terminated pod 808B rather than by polling worker node 612D.

In response to receiving instructions from master node 606 to deploy replacement pod 808C, worker node 612C may deploy replacement pod 808C thereon. The service into which software applications 800, 802, and 804 are organized may be updated to reflect that pod 808B has been replaced by pod 808C. Subsequent traffic to the service may thus utilize pod 808C on worker node 612C rather than now-terminated pod 808B on worker node 612D. This change in the distribution of pods across computing cluster 604 may be identified based on the configuration data and additional traffic data generated by packet detection modules disposed on worker nodes 612A, 612B, and 612C.

Figure 8D:
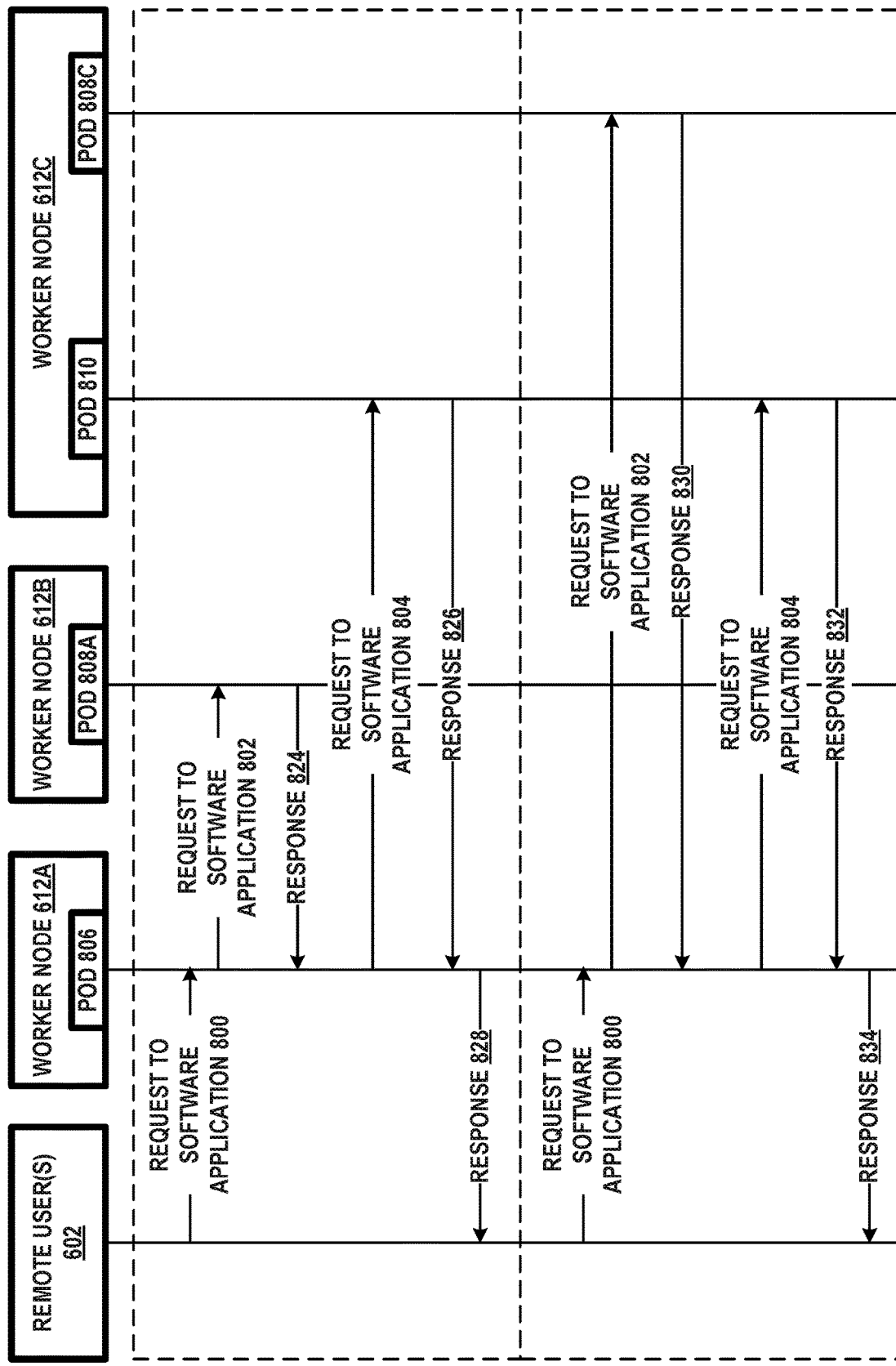
FIG. 8D depicts a message diagram related to deployment of containerized software applications, in accordance with example embodiments.

FIG. 8D illustrates additional traffic to software applications 800, 802, and 804 that allows the updated communicative relationships therebetween to be determined. Namely, an additional seventh request from remote user(s) 602 may be received by front-end software application 800 executing in pod 806. Pod 806 may, in response, transmit an eighth requests to software application 802 by utilizing pod 808A, as shown in the top portion of FIG. 8D. In response, software application 802 executing in pod 808A may process the eighth request and provide a corresponding response 824. Pod 806 may also transmit a ninth request to software application 804 executing in pod 810. In response, software application 804 executing in pod 810 may process the request and provide a corresponding response 826. Software application 800 may then provide response 828 to remote user(s) 602.

A further tenth request from remote user(s) 602 may be received by front-end software application 800 executing in pod 806. Pod 806 may, in response, transmit an eleventh request to software application 802 by utilizing pod 808C, as shown in the bottom portion of FIG. 8D. In response, software application 802 executing in pod 808C may process the eleventh request and provide a corresponding response 830. Pod 806 may also transmit a twelfth request to software application 804 executing in pod 810. In response, software application 804 executing in pod 810 may process the twelfth request and provide a corresponding response 832. Software application 800 may then provide response 834 to remote user(s) 602.

The network traffic monitored after replacement of pod 808B with pod 808C may allow the new communicative relationships between the pods to be updated based on the redistribution of pods across worker nodes 612A, 612B, 612C, and 612D. Namely, the stored traffic data may indicate that pod 806 now accesses pod 808C rather than pod 808B to execute software application 802. The stored traffic data may indicate that pod 808C is hosted by worker node 612C and not by worker node 612D, as was the case for pod 808B. The computing device may again parse the stored traffic data to identify the new communicative relationships. Notably, in some cases, more than two requests from remote user(s) 602 may be needed to completely map out the communicative relationships between the pods. Additionally, the monitored network traffic may include traffic that is not caused by a request from remote user(s) 602. Pods may, for example, communicate with one another to execute various background tasks as part of the operation of the software applications executing therein.

Figure 9B:
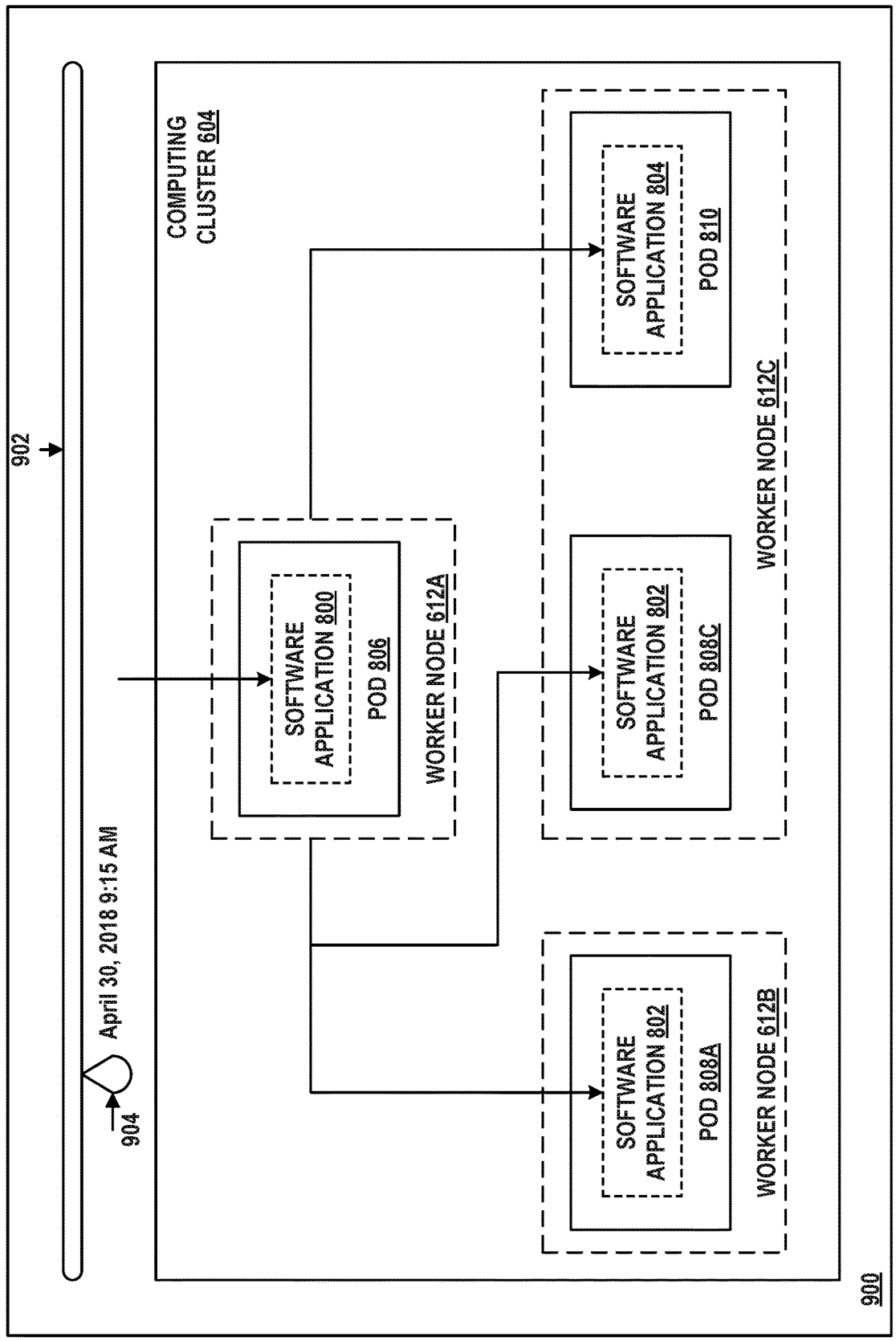

FIG. 9B shows graphical user interface 900 updated to illustrate the communicative relationships amongst components of computing cluster 604 after replacement of pod 808B with pod 808C. Notably, cursor 904 has moved towards the right and the time corresponding thereto (i.e., Apr. 30, 2018 9:15 AM) has been updated to indicate that FIG. 9B shows the state of computing cluster at a later time than FIG. 9A. FIG. 9B illustrates that pod 808B has been replaced with pod 808C which is hosted by worker node 612C. Although not shown in FIGS. 9A and 9B, the communicative relationships may additionally include communicative relationships between pods executing on the same worker node, as well as communicative relationships between pods and other computing devices outside of computing cluster 604. Thus, in some embodiments, FIG. 9B might still show relationship(s) with worker node 612D, but these relationship(s) may be de-emphasized.

Figure 8E:
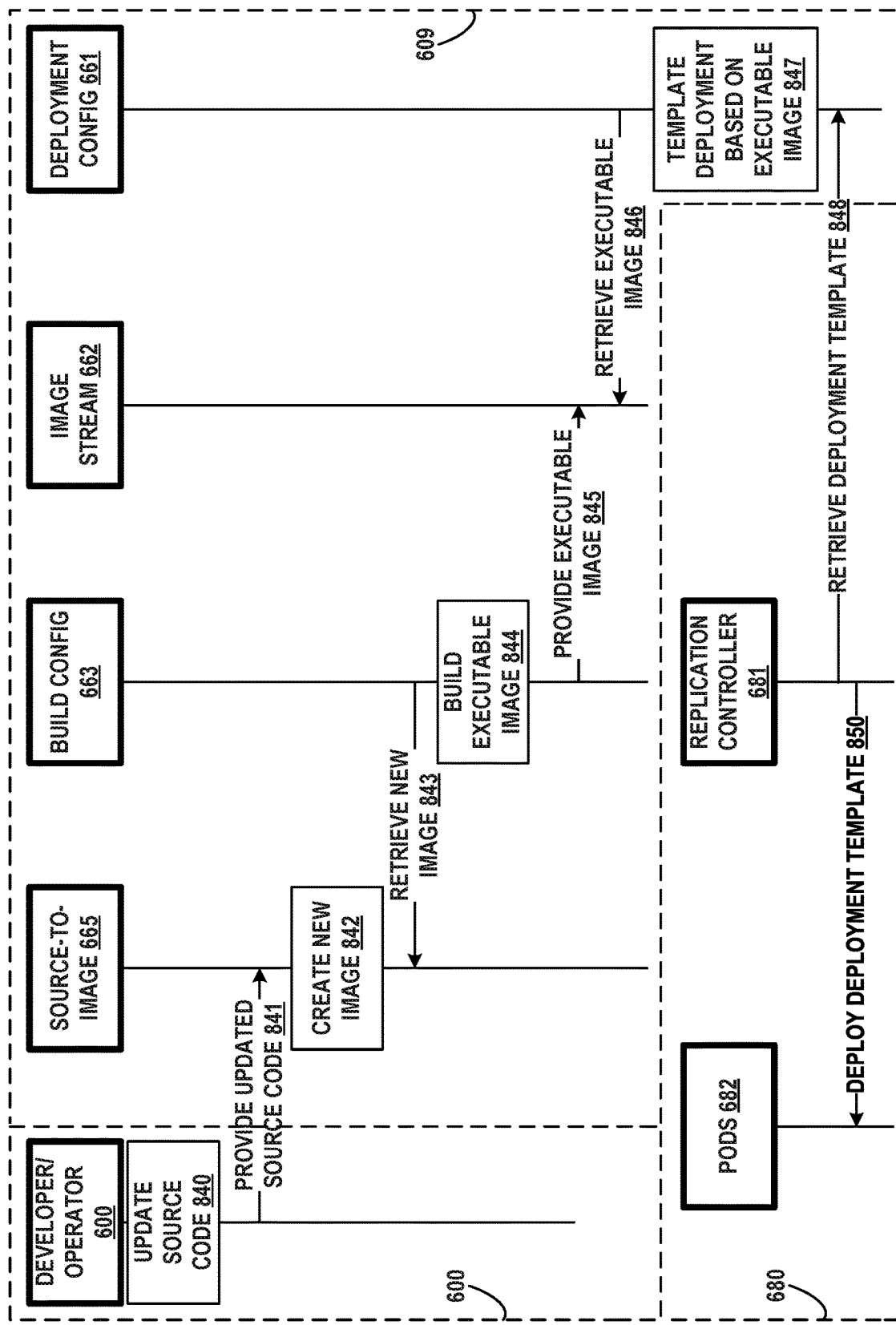
FIG. 8E depicts a message diagram related to deployment of containerized software applications using a containerized application platform, in accordance with example embodiments.

FIG. 8E depicts a message diagram related to deployment of containerized software applications. The deployment of containerized software applications may be performed using both a containerized orchestration engine (e.g., the containerized orchestration engine 680 illustrated and described with respect to FIG. 6C) and a containerized application platform (e.g., the containerized application platform 609 illustrated and described with respect to FIG. 6C). Further, portions or the entirety of FIG. 8E may correspond to a development pipeline (e.g., a Jenkins pipeline).

At block 840, a Developer/Operator (e.g., the Developer/Operator 600 illustrated and described with respect to FIG. 6A) may update source code associated with a containerized software application to be executed on one or more pods of a computing cluster (e.g., the pods 620A, 620B of the computing cluster 604 illustrated and described with respect to FIG. 6A). Such source code may be updated to provide a new, stable release of the containerized software application (e.g., to provide one or more beneficial updates and/or bug fixes to the containerized software application). The updated source code may be stored in a repository (e.g., a Git repository). In some embodiments, the Developer/Operator 600 may be able to monitor one or more of the downstream processes occurring in FIG. 8E (e.g., using a user interface, such as the web console illustrated and described with respect to FIG. 6B or through an API, such as the API 608 illustrated and described with respect to FIG. 6A).

At communication 841, an S2I of the containerized application platform 609 (e.g., the S2I 665 illustrated and described with respect to FIG. 6C) may retrieve the updated source code. Retrieving the updated source code may include determining that an updated source code exists in a corresponding source code repository (e.g., based on a web-hook associated with a build configuration, such as the build configuration 663 illustrated and described with respect to FIG. 6C).

At block 842, the S2I 665 may create a new image based on the updated source code using directions stored within the S2I 665. For example, creating the image may include compiling one or more parts of the retrieved, updated source code and/or checking the retrieved, updated source code for errors.

At communication 843, the build configuration 663 may retrieve the executable image. The build configuration 663 may constantly monitor the S2I 665 to identify when a new image is present and then retrieve it. In alternate embodiments, the build configuration 663 may instead retrieve an image from an integrated container registry (e.g., the integrated container registry 664 of FIG. 6C).

At block 844, the build configuration 663 may build an executable image based on the image from the S2I 665. The build configuration 663 may include instructions regarding generating an executable image (e.g., by combining the image created by the S2I 665 at block 842 with a builder image).

At communication 845, the build configuration 663 may provide the executable image to the image stream 662.

At communication 846, the deployment configuration 661 may retrieve the executable image from the image stream 662. The deployment configuration 661 may monitor the image stream 662 to identify when a new executable image is present and then retrieve it. In this way, when a new image is available, the deployment configuration 661 may retrieve it and deploy it across the pods 682 using the containerized orchestration engine 680.

At block 847, the deployment configuration 661 may generate a deployment template based on the executable image built by the build configuration 663 at block 844. The deployment configuration 661 may include instructions regarding generating a deployment template, for example.

At communication 848, the replication controller 681 may retrieve the deployment template from the deployment configuration 661. The replication controller 681 may constantly communicate with the deployment configuration to receive the deployment template when a new deployment template is to be employed to the pods 682 (e.g., when the new deployment template is requested to be deployed by Developer/Operator 600).

At communication 849, the replication controller 681 may deploy the deployment template created using the deployment configuration 661 to one or more of the pods 682. As described above, the replication controller 681 may have instructions regarding how to deploy and monitor containerized software applications in deployments across one or more pods.

Figure 8F:
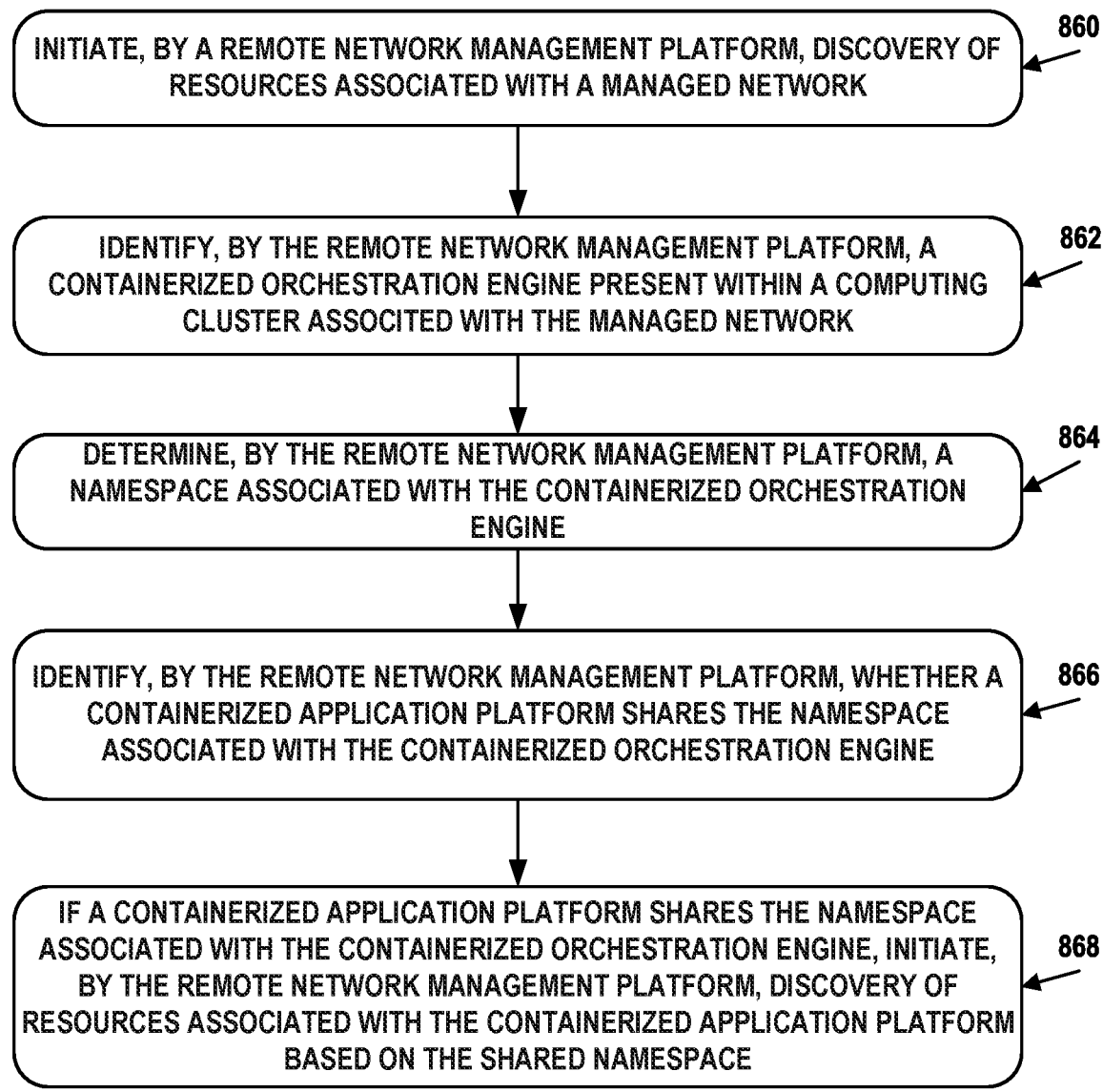
FIG. 8F is a flow chart, in accordance with example embodiments.

FIG. 8F is a flow chart illustrating an example embodiment of a discovery process. The process illustrated by FIG. 8F may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8F may be may be simplified by the removal of any one or more of the features shown therein. Further, these embodiments may be combined with features, aspects, and/or implementations of any of the previous figures or otherwise described herein. In some embodiments, one or more of the blocks described below as being performed by a remote network management platform may be performed by a database disposed within the remote network management platform.

The process of FIG. 8F may be performed to accomplish a complete discovery of both the containerized application platform 609 and the containerized orchestration engine 680. As indicated, the process may begin by performing a discovery of resources associated with the containerized orchestration engine 680 and then continue on (e.g., in an automated fashion) by checking if there is an associated containerized application platform 609. After identifying that there is an associated containerized application platform 609, the process may involve discovering the resources of the containerized application platform 609. Alternatively, though, a user could indicate that they would like to only discover resources associated with the containerized orchestration engine 680. In such cases, the process may include fewer steps than illustrated in FIG. 8F.

Block 860 may involve initiating, by the remote network management platform (e.g., the remote network management platform 320 illustrated and described with reference to FIG. 7), discovery of resources associated with a managed network (e.g., the managed network 300 illustrated and described with reference to FIG. 7).

Block 862 may involve identifying, by the remote network management platform, a containerized orchestration engine (e.g., the containerized orchestration engine 680 illustrated and described with respect to FIG. 6C) present within a computing cluster (e.g., the computing cluster 604 illustrated and described with reference to FIG. 7) associated with the managed network.

Block 864 may involve determining, by the remote network management platform, a namespace (e.g., the containerized namespace 650 illustrated and described with respect to FIG. 6C) associated with the containerized orchestration engine.

Block 866 may involve identifying, by the remote network management platform, whether a containerized application platform (e.g., the containerized application platform 609 illustrated and described with respect to FIG. 6C) shares the namespace associated with the containerized orchestration engine.

Block 868 may involve, if a containerized application platform shares the namespace associated with the containerized orchestration engine, initiating, by the remote network management platform, discovery of resources associated with the containerized application platform based on the shared namespace.

Figure 8G:
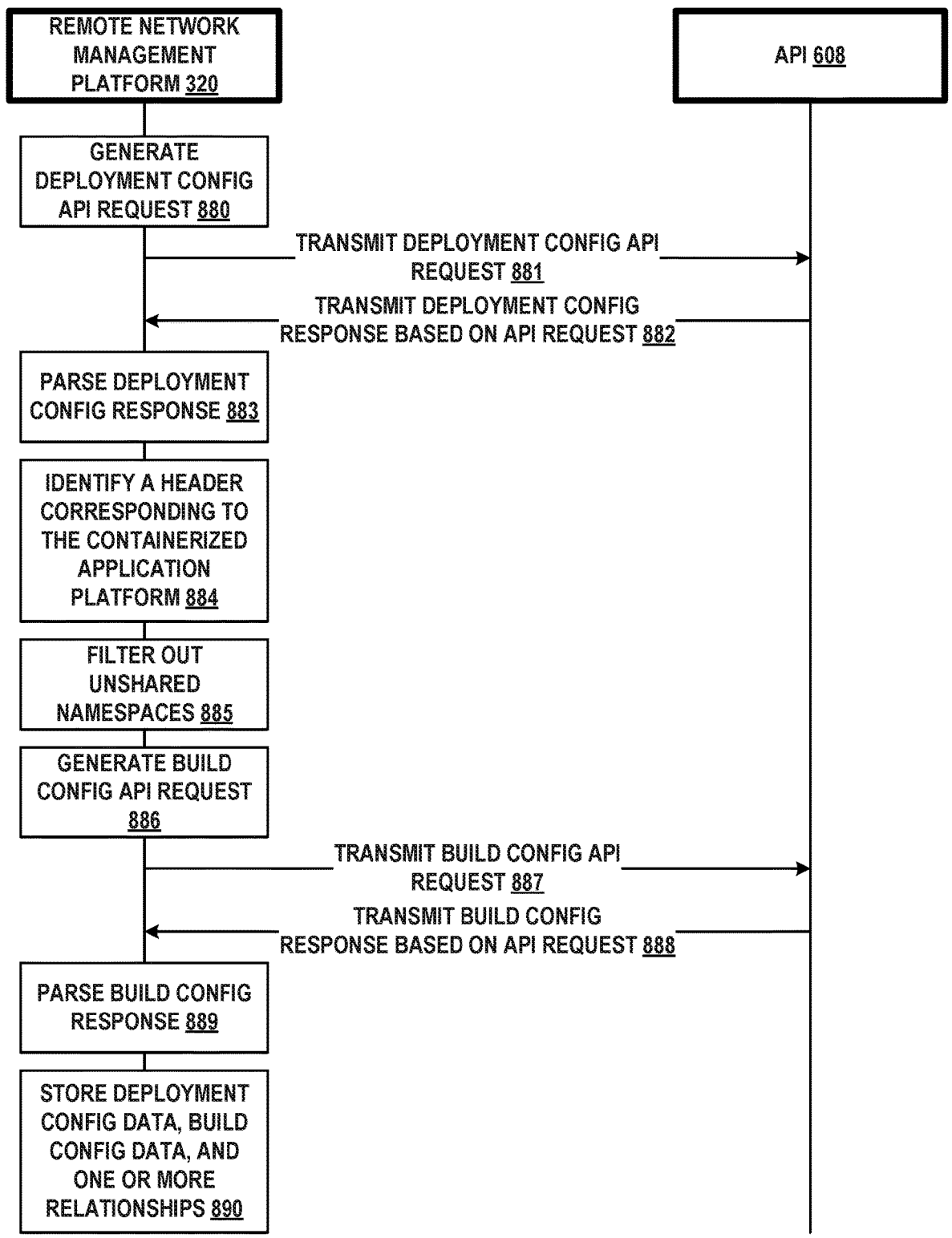
FIG. 8G depicts a message diagram related to a discovery process, in accordance with example embodiments.

FIG. 8G depicts a message diagram related to an example discovery process (e.g., used to discover resources associated with a containerized application platform, such as the containerized application platform 609 illustrated and described with respect to FIG. 6C). The discovery process may include a remote network management platform (e.g., the remote network management platform 320 illustrated and described with respect to FIG. 7) interacting with a computing cluster (e.g., the computing cluster 604 illustrated and described with respect to FIG. 7) using an API (e.g., API 608 illustrated and described with reference to FIG. 6A). In some embodiments, the remote network management platform 320 may discover resources of the containerized application platform 609 on behalf of a managed network (e.g., the managed network 300 illustrated and described with reference to FIG. 7).

At block 880, the process may involve the remote network management platform 320 (e.g., a computing device of the remote network management platform 320) generating a deployment configuration API request.

At communication 881, the process may involve the remote network management platform 320 (e.g., a computing device of the remote network management platform 320) transmitting the deployment configuration API request generated in block 880 to API 608. In some embodiments, the deployment configuration API request may be a REST query designed for a deployment configuration API. Further, in some embodiments, the deployment configuration API request may be generated such that it syntactically corresponds to a format requested by the deployment configuration API. In alternate embodiments, the process may involve requesting a token for the deployment configuration API. The token may be used in block 880 and/or communication 881, for example.

At communication 882, the process may involve API 608 transmitting a deployment configuration response based on the API request received in communication 881. In addition, in some embodiments, the deployment configuration response may include a page-delimited series of deployment configurations. For example, the deployment configuration response may include a number of objects (e.g., JSON objects) listed within a single file, wherein each object begins on a subsequent page of the file.

At block 883, the process may involve the remote network management platform 320 (e.g., a computing device of the remote network management platform 320) parsing the deployment configuration response transmitted in communication 882. In some embodiments (e.g., embodiments where the deployment configuration response includes a page-delimited series of deployment configurations), parsing the deployment configuration response may include identifying that the deployment configuration (e.g., the deployment configuration 661 illustrated and described with respect to FIG. 6C) that shares the namespace with the containerized orchestration engine 680 from among the page-delimited series of deployment configurations.

At block 884, the process may involve the remote network management platform 320 (e.g., a computing device of the remote network management platform 320) identifying a header corresponding to the containerized application platform 609 based on the parsed deployment configuration response. The header may be identified based on a previous discovery of a containerized orchestration engine. For example, a containerized namespace associated with the containerized orchestration engine may be used to identify a header corresponding to the containerized application platform 609. In some embodiments, upon identifying that the header corresponding to the containerized application platform 609 is present within the parsed deployment configuration response, the remote network management platform 320 may store (e.g., within a database of the remote network management platform 320) an indication that the containerized application platform 609 shares the containerized namespace 650 with the containerized orchestration engine 680. In alternate embodiments, if it is identified that a header corresponding to the containerized application platform 609 is not present in the parsed deployment configuration response, the process may end and an indication may be provided to one or more users (e.g., users of the managed network 300 associated with the remote network management platform 320) that no containerized application platform 609 is associated with the containerized orchestration engine 680 (e.g., within the computing cluster 604).

At block 885, the process may involve the remote network management platform 320 (e.g., a computing device of the remote network management platform 320) filtering out unshared namespaces. For example, the remote network management platform 320 may have identified a containerized namespace associated with a containerized orchestration engine (e.g., the containerized orchestration engine 680 illustrated and described with respect to FIG. 6C). Any objects associated with namespaces other than the containerized namespace (i.e., any objects not associated with the containerized orchestration engine 680) may be removed from the parsed deployment configuration response. After the filtering, only those objects associated with both the containerized orchestration engine 680 and the containerized application platform 609 may remain.

At block 886, the process may involve the remote network management platform 320 (e.g., a computing device of the remote network management platform 320) generating a build configuration API request. In some embodiments, the build configuration API request may be a REST query designed for a build configuration API.

At communication 887, the process may involve the remote network management platform 320 (e.g., a computing device of the remote network management platform 320) transmitting the build configuration API request generated in block 886 to API 608.

At communication 888, the process may involve API 608 transmitting a build configuration response based on the API request received in communication 887.

At block 889, the process may involve the remote network management platform 320 (e.g., a computing device of the remote network management platform 320) parsing the build configuration response transmitted in communication 888.

At block 890, the process may involve the remote network management platform 320 (e.g., a computing device of the remote network management platform 320) storing deployment configuration data, build configuration data, and one or more relationships between the deployment configuration data and the build configuration data.

In some embodiments, the process of FIG. 8G may include the remote network management platform 320 (e.g., a computing device of the remote network management platform 320) discovering one or more additional resources associated with the containerized application platform 609.

For example, the remote network management platform 320 may query a route API associated with the containerized application platform 609 to obtain route data associated with a route of the containerized application platform 609. The route (e.g., one of the routes 666 illustrated and described with reference to FIG. 6C) may refer to a pod of the one or more pods (e.g., the one or more pods 682 illustrated and described with reference to FIG. 6C) and may provide a DNS entry point by which the point can be accessed by a device outside of the computing cluster 604. Further, the remote network management platform 320 (e.g., a computing device of the remote network management platform 320) may store, in a database of the remote network management platform 320, the route data and one or more relationships between: (i) the route data, and (ii) the deployment configuration data and/or the build configuration data.

Similarly, the remote network management platform 320 may query a group API associated with the containerized application platform 609 to obtain group data associated with a group (e.g., one of the groups 669 illustrated and described with reference to FIG. 6C) of the containerized application platform 609. The group may include a collection of users (e.g., one or more of the users 670 illustrated and described with reference to FIG. 6C) with access to the containerized application platform 609. Further, the remote network management platform 320 (e.g., a computing device of the remote network management platform 320) may store, in a database of the remote network management platform 320, the group data and one or more relationships between: (i) the group data, and (ii) the deployment configuration data and/or the build configuration data.

In still other embodiments, the remote network management platform 320 may query a user API associated with the containerized application platform 609 to obtain user data associated with a user (e.g., one of the users 670 illustrated and described with reference to FIG. 6C) of the containerized application platform 609. Further, the remote network management platform 320 (e.g., a computing device of the remote network management platform 320) may store, in a database of the remote network management platform 320, the user data and one or more relationships between: (i) the user data, and (ii) the deployment configuration data, the build configuration data, and/or the group data.

In even further embodiments, the remote network management platform 320 may query a project API associated with the containerized application platform 609 to obtain project data associated with a project (e.g., one of the projects 668 illustrated and described with reference to FIG. 6C) of the containerized application platform 609. The project may be associated with the group. The group may have been granted access to the namespace (e.g., the containerized namespace 650 illustrated and described with respect to FIG. 6C). In addition, the remote network management platform 320 (e.g., a computing device of the remote network management platform 320) may store, in a database of the remote network management platform 320, the user data and one or more relationships between: (i) the project data, and (ii) the deployment configuration data, the build configuration data, and/or the group data.

In yet further embodiments, the remote network management platform 320 may query an image API associated with the containerized application platform 609 to obtain image data associated with an executable image. The executable image may include instructions executable by one or more pods (e.g., the pods 620A, 620B illustrated and described with respect to FIG. 6A) of one or more worker nodes (e.g., the worker nodes 614A, 614B illustrated and described with respect to FIG. 6A) to perform tasks associated with one or more of the containerized software applications. In addition, the remote network management platform 320 (e.g., a computing device of the remote network management platform 320) may store, in a database of the remote network management platform 320, the image data and one or more relationships between: (i) the image data, and (ii) the deployment configuration data and/or the build configuration data.

In still yet further embodiments, the remote network management platform 320 may query an image stream API associated with the containerized application platform 609 to obtain image stream data associated with an image stream (e.g., the image stream 662 illustrated and described with respect to FIG. 6C) of the containerized application platform 609. The image stream 662 may track one or more executable images to be deployed to one or more pods (e.g., the pods 620A, 620B illustrated and described with reference to FIG. 6A) using a deployment configuration (e.g., the deployment configuration 661 illustrated and described with reference to FIG. 6C). In addition, the remote network management platform 320 (e.g., a computing device of the remote network management platform 320) may store, in a database of the remote network management platform 320, the image stream data and one or more relationships between: (i) the image stream data, and (ii) the deployment configuration data, the build configuration data, and/or the image data.

In some embodiments, the remote network management platform 320 may also be used to identify additional namespaces associated with other projects groups, and/or users and/or with other containerized application platforms. For example, the remote network management platform 320 (e.g., a computing device of the remote network management platform 320) may also be configured to identify an additional namespace associated with the containerized orchestration engine 680. Further, the remote network management platform 320 may be configured to query the deployment configuration API associated with the containerized application platform 609 that shares the additional namespace with the containerized orchestration engine 680 to obtain additional deployment configuration data associated with an additional deployment configuration of the containerized application platform 609. Even further, the remote network management platform 320 may be configured to query the build configuration API associated with the containerized application platform 609 to obtain additional build configuration data associated with an additional build configuration of the containerized application platform 609. Yet further, the remote network management platform 320 may be configured to store, in a database of the remote network management platform 320, the additional deployment configuration data, the additional configuration data, and one or more relationships between the additional deployment configuration data and the additional build configuration data.

In some embodiments, the remote network management platform 320 may be configured to store, in a database of the remote network management platform 320, relationships between various objects of the containerized application platform 609 and objects of the containerized orchestration engine 680. For example, the remote network management platform 320 may be configured to store, in the database, one or more relationships between the deployment configuration data and one or more objects of the containerized orchestration engine 680, one or more relationships between the deployment configuration data and one or more other objects of the containerized application platform 609, one or more relationships between the build configuration data and the one or more objects of the containerized application platform 609, and/or one or more relationships between the build configuration data and one or more other objects of the containerized application platform 609.

IX. EXAMPLE OPERATIONS

Figure 10:
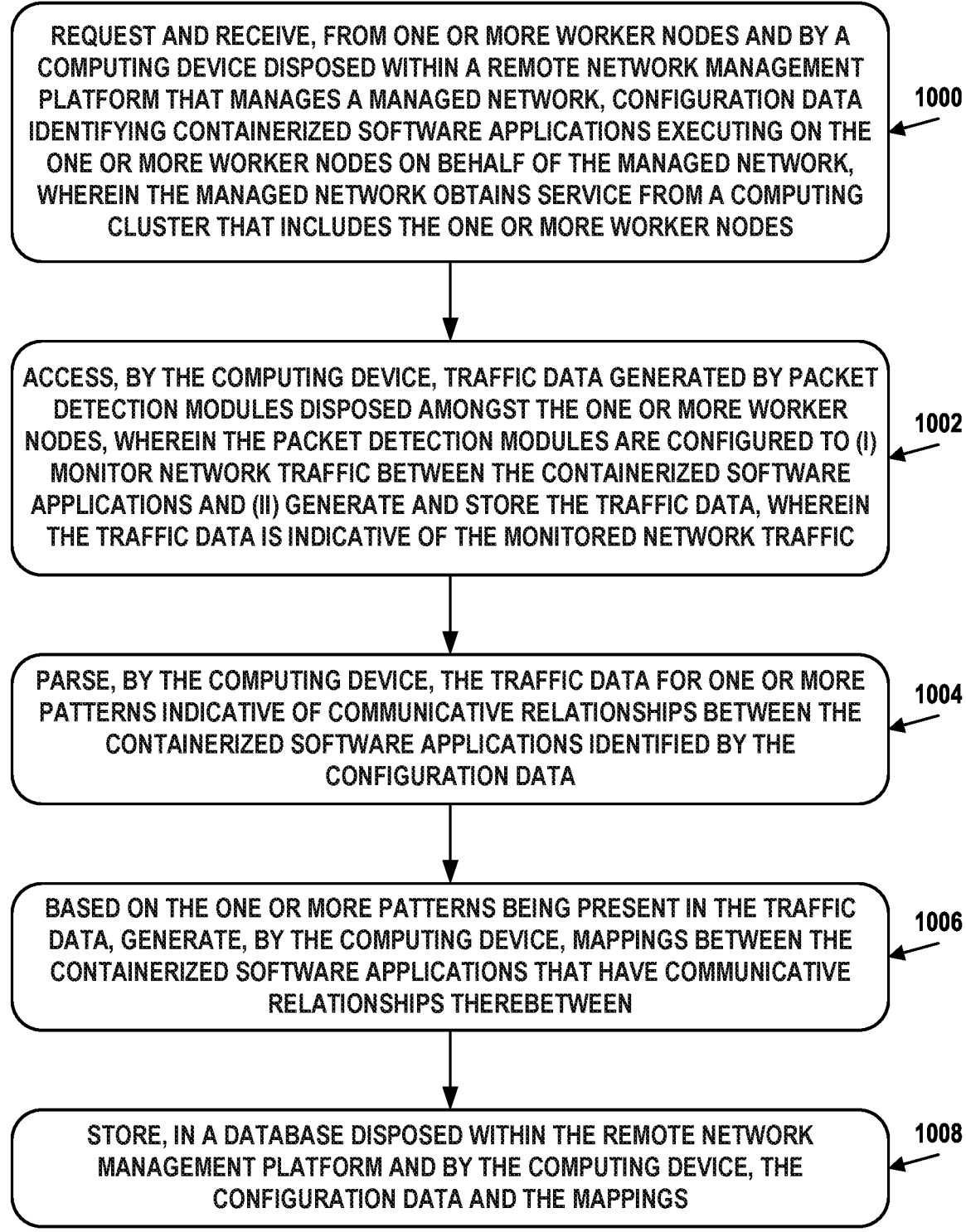
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve requesting and receiving, from one or more worker nodes and by a computing device disposed within a remote network management platform that manages a managed network, configuration data identifying containerized software applications executing on the one or more worker nodes on behalf of the managed network. The managed network may obtain service from a computing cluster that includes the one or more worker nodes.

Block 1002 may involve accessing, by the computing device, traffic data generated by packet detection modules disposed amongst the one or more worker nodes. The packet detection modules may be configured to (i) monitor network traffic between the containerized software applications and (ii) generate and store the traffic data. The traffic data may be indicative of the monitored network traffic.

Block 1004 may involve parsing, by the computing device, the traffic data for one or more patterns indicative of communicative relationships between the containerized software applications identified by the configuration data.

Block 1006 may involve, based on the one or more patterns being present in the traffic data, generating, by the computing device, mappings between the containerized software applications that have communicative relationships therebetween.

Block 1008 may involve storing, in a database disposed within the remote network management platform and by the computing device, the configuration data and the mappings.

In some embodiments, the one or more worker nodes may be configured to execute the containerized software applications in pods. Each pod may be configured to execute therein one or more of the containerized software applications. A master node may be configured to manage distribution of the pods across the one or more worker nodes by receiving an indication of a desired number of pods for each containerized software application of the containerized software applications. The master node may also be configured to manage distribution of the pods across the one or more worker nodes by providing instructions to the one or more worker nodes to initiate execution of the desired number of pods for each containerized software application across the one or more worker nodes. The master node may additionally be configured to manage distribution of the pods across the one or more worker nodes by determining that one or more pods of the desired number of pods have terminated and by providing instructions to the one or more worker nodes to replace the one or more pods that have terminated with one or more replacement pods to maintain the desired number of pods for each containerized software application. The configuration data identifying the containerized software applications may indicate the one or more pods that have terminated and the one or more replacement pods. The traffic data may indicate monitored network traffic related to the one or more pods that have terminated and the one or more replacement pods.

In some embodiments, a definition of a graph that represents the containerized software applications as nodes and the communicative relationships therebetween as links may be generated. The definition of the graph may be stored in the database.

In some embodiments, a representation of a graphical user interface that displays the graph in accordance with the stored definition may be provided to a client device associated with the managed network.

In some embodiments, the monitored network traffic further includes network traffic between the containerized software applications and one or more computing devices external to the computing cluster.

In some embodiments, the packet detection modules are configured to generate and store the traffic data indicative of the monitored network traffic by identifying, within the monitored network traffic, TCP SYN packets exchanged between the containerized software applications. A TCP SYN packet indicates initiation of a new network connection. The packet detection modules are also configured to generate and store the traffic data indicative of the monitored network traffic by storing traffic data indicative of the TCP SYN packets exchanged between the containerized software applications.

In some embodiments, (i) the requesting and receiving of configuration data and (ii) the accessing of the traffic data may be periodically repeated to monitor a distribution of the containerized software applications across the one or more worker nodes over time.

In some embodiments, the configuration data and the mappings corresponding thereto may be timestamped. Storing the configuration data and the mappings may involve storing a timestamp associated with the configuration data and the mappings corresponding thereto to represent the distribution of the containerized software applications across the one or more worker nodes over time.

In some embodiments, parsing the traffic data for the one or more patterns may involve determining that a first containerized software application identified by the configuration data transmitted one or more packets of a given type to a second containerized software application identified by the configuration data.

In some embodiments, the first containerized software application may be executed by a first worker node of the one or more worker nodes and the second containerized software application may be executed by a second worker node of the one or more worker nodes. The first worker node may different from the second worker node.

In some embodiments, the first containerized software application and the second containerized software application may each be executed by a first worker node of the one or more worker nodes.

In some embodiments, the computing cluster may be disposed within one or more of (i) the remote network management platform, (ii) the managed network, or (iii) a third-party computing system different from the remote network management platform and the managed network.

In some embodiments, the configuration data identifying the containerized software applications includes a group of one or more of (i) an indication of a pod in which a particular software application is being executed, (ii) an indication of a container within a pod in which the particular software application is being executed, (iii) an indication of processes executing within the container in which the particular software application is being executed, and (iv) a service with which the pod in which the particular software application is being executed is associated.

In some embodiments, a system may include means, disposed within a remote network management platform that manages a managed network, for requesting and receiving, from one or more worker nodes, configuration data identifying containerized software applications executing on the one or more worker nodes on behalf of the managed network. The managed network obtains service from a computing cluster that includes the one or more worker nodes. The system may also include means for accessing traffic data generated by packet detection modules disposed amongst the one or more worker nodes. The packet detection modules may be configured to (i) monitor network traffic between the containerized software applications and (ii) generate and store the traffic data. The traffic data may be indicative of the monitored network traffic. The system may additionally include means for parsing the traffic data for one or more patterns indicative of communicative relationships between the containerized software applications identified by the configuration data. The system may further include means for, based on the one or more patterns being present in the traffic data, generating mappings between the containerized software applications that have communicative relationships therebetween. The system may yet further include means for storing, in a database disposed within the remote network management platform, the configuration data and the mappings.

Figure 11:
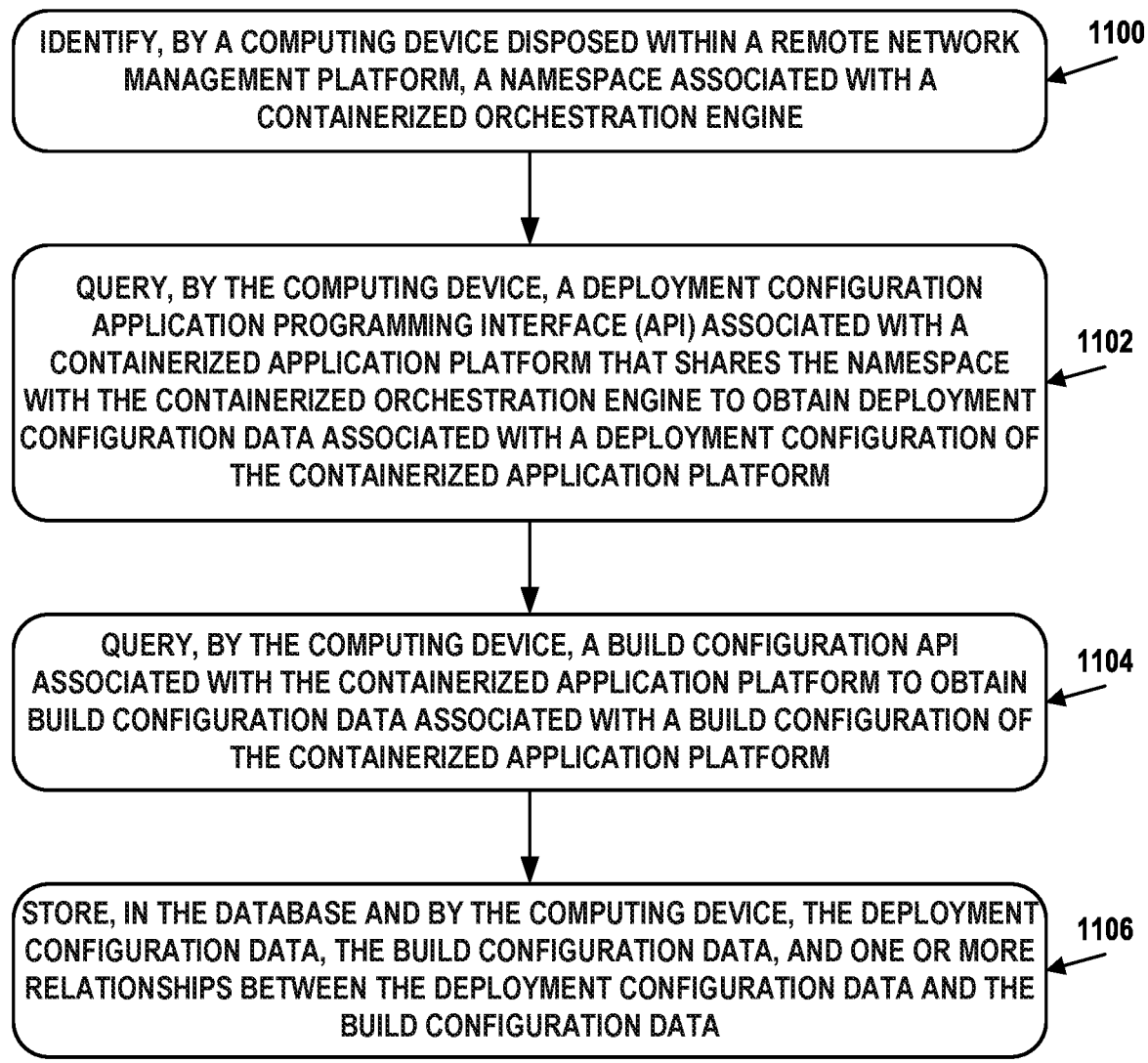
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve identifying, by a computing device disposed within a remote network management platform, a namespace associated with a containerized orchestration engine. A database may also be disposed within the remote network management platform. The remote network management platform may be associated with a managed network. The managed network may obtain service from a computing cluster that includes one or more worker nodes. The one or more worker nodes may be configured to execute containerized software applications using the containerized orchestration engine. The containerized orchestration engine may facilitate management, execution, and distribution of the containerized software applications across one or more pods hosted on the one or more worker nodes.

Block 1102 may involve querying, by the computing device, a deployment configuration API associated with a containerized application platform that shares the namespace with the containerized orchestration engine to obtain deployment configuration data associated with a deployment configuration of the containerized application platform. The containerized application platform may provide tools for deployment and monitoring of the containerized software applications. The deployment configuration may provide a deployment template by which executable images of the containerized software applications are deployed across the one or more pods using a replication controller of the containerized orchestration engine.

Block 1104 may involve querying, by the computing device, a build configuration API associated with the containerized application platform to obtain build configuration data associated with a build configuration of the containerized application platform. The build configuration may provide a build template by which executable images of the containerized software applications are built from source code within the containerized application platform.

Block 1106 may involve storing, in the database and by the computing device, the deployment configuration data, the build configuration data, and one or more relationships between the deployment configuration data and the build configuration data.

In some embodiments, the process may involve parsing, by the computing device, a response to the deployment configuration API query to identify whether a header corresponding to the containerized application platform is present. The process may also involve, upon identifying that the header is present, storing, in the database and by the computing device, an indication that the containerized application platform shares the namespace with the containerized orchestration engine.

In some embodiments, block 1102 may involve generating, by the computing device, a deployment configuration API request that syntactically corresponds to the deployment configuration API. Block 1102 may also involve submitting, by the computing device, the deployment configuration API request to the deployment configuration API. Further, block 1102 may involve receiving, by the computing device, a deployment configuration response based on the deployment configuration API request. In addition, block 1102 may involve parsing, by the computing device, the deployment configuration response. Still further, block 1102 may involve filtering out, by the computing device, deployment configuration data from the deployment configuration response that do not share the namespace. While block 1102 corresponds to querying the deployment configuration API, a similar process of generating an API request that syntactically corresponds to an API, submitting the generated API request, receiving a response, parsing the response, and filtering out data that does not share the namespace could be applied with any query to any API (e.g., any API associated with the containerized application platform), as described herein.

In some embodiments, the deployment configuration response may include a page-delimited series of deployment configurations. Parsing the deployment configuration response may include identifying the deployment configuration that shares the namespace with the containerized orchestration engine from among the page-delimited series of deployment configurations.

In some embodiments, the process may involve querying, by the computing device, a route API associated with the containerized application platform to obtain route data associated with a route of the containerized application platform. The route may refer to a pod of the one or more pods and provides a DNS entry point by which the pod can be accessed by a device outside of the computing cluster. The process may also involve storing, in the database and by the computing device, the route data and one or more relationships between: (i) the route data, and (ii) the deployment configuration data or the build configuration data.

In some embodiments, the process may involve querying, by the computing device, a group API associated with the containerized application platform to obtain group data associated with a group of the containerized application platform. The group may include a collection of users with access to the containerized application platform. The process may also involve storing, in the database and by the computing device, the group data and one or more relationships between: (i) the group data, and (ii) the deployment configuration data or the build configuration data.

In some embodiments, the process may involve querying, by the computing device, a user API associated with the containerized application platform to obtain user data associated with a user of the containerized application platform. The process may also involve storing, in the database and by the computing device, the user data and one or more relationships between: (i) the user data, and (ii) the deployment configuration data, the build configuration data, or the group data.

In some embodiments, the process may involve querying, by the computing device, a project API associated with the containerized application platform to obtain project data associated with a project of the containerized application platform. The project may be associated with the group. The group may have been granted access to the namespace. The process may also involve storing, in the database and by the computing device, the project data and one or more relationships between: (i) the project data, and (ii) the deployment configuration data, the build configuration data, or the group data.

In some embodiments, the process may involve querying, by the computing device, an image API associated with the containerized application platform to obtain image data associated with an executable image of the containerized application platform. The executable image may include instructions executable by the one or more pods of the one or more worker nodes to perform tasks associated with one or more of the containerized software applications. The process may also involve storing, in the database and by the computing device, the image data and one or more relationships between: (i) the image data, and (ii) the deployment configuration data or the build configuration data.

In some embodiments, the process may involve querying, by the computing device, an image stream API associated with the containerized application platform to obtain image stream data associated with an image stream of the containerized application platform. The image stream may track one or more executable images to be deployed to one or more pods using the deployment configuration. The process may also involve storing, in the database and by the computing device, the image stream data and one or more relationships between: (i) the image stream data, and (ii) the deployment configuration data, the build configuration data, or the image data.

In some embodiments, the database may include a credential repository associated with the containerized application platform. The credential repository may store credentials used by the computing device to obtain permissions to access the deployment configuration API or the build configuration API.

In some embodiments, identifying the namespace associated with the containerized orchestration engine may include receiving data from a user device that includes the credentials used by the computing device to obtain permissions to access the deployment configuration API or the build configuration API.

In some embodiments, the process may involve identifying, by the computing device, an additional namespace associated with the containerized orchestration engine. The process may also involve querying, by the computing device, the deployment configuration API associated with the containerized application platform that shares the additional namespace with the containerized orchestration engine to obtain additional deployment configuration data associated with an additional deployment configuration of the containerized application platform. Further, the process may involve querying, by the computing device, the build configuration API associated with the containerized application platform to obtain additional build configuration data associated with an additional build configuration of the containerized application platform. In addition, the process may involve storing, in the database and by the computing device, the additional deployment configuration data, the additional build configuration data, and one or more relationships between the additional deployment configuration data and the additional build configuration data.

In some embodiments, the process may involve storing, in the database and by the computing device, one or more relationships between the deployment configuration data and one or more objects of the containerized orchestration engine or one or more relationships between the build configuration data and the one or more objects of the containerized orchestration engine.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a database disposed within a remote network management platform associated with a managed network, wherein the managed network obtains service from a computing cluster that includes one or more worker nodes, wherein the one or more worker nodes are configured to execute containerized software applications using a containerized orchestration engine, and wherein the containerized orchestration engine facilitates management, execution, and distribution of the containerized software applications across one or more pods hosted on the one or more worker nodes; and
   a computing device disposed within the remote network management platform, wherein the computing device comprises a processor and a memory storing instructions that, when executed by the processor, cause the processor to:
      identify a namespace associated with the containerized orchestration engine;
      query a deployment configuration application programming interface (API) associated with a containerized application platform that shares the namespace with the containerized orchestration engine to obtain deployment configuration data associated with a deployment configuration of the containerized application platform, wherein the containerized application platform provides tools configured to deploy and monitor the containerized software applications, and wherein the deployment configuration provides a deployment template by which one or more first executable images of the containerized software applications are deployed across the one or more pods using a replication controller of the containerized orchestration engine;
      query a build configuration API associated with the containerized application platform to obtain build configuration data associated with a build configuration of the containerized application platform, wherein the build configuration provides a build template by which one or more second executable images of the containerized software applications are built from source code within the containerized application platform, and wherein at least one executable image is common between the one or more first executable images and the one or more second executable images; and
      store, in the database, the deployment configuration data, the build configuration data, and one or more relationships between the deployment configuration data and the build configuration data.

2. The computing system of claim 1, wherein the instructions, when executed by the processor, cause the processor to:
   parse a response to the deployment configuration API query to identify whether a header corresponding to the containerized application platform is present; and
   upon identifying that the header is present, store, in the database, an indication that the containerized application platform shares the namespace with the containerized orchestration engine.

3. The computing system of claim 1, wherein querying the deployment configuration API comprises:
   generating a deployment configuration API request that syntactically corresponds to the deployment configuration API;
   submitting the deployment configuration API request to the deployment configuration API;
   receiving a deployment configuration response based on the deployment configuration API request;
   parsing the deployment configuration response; and
   filtering out deployment configuration data from the deployment configuration response that do not share the namespace.

4. The computing system of claim 3, wherein the deployment configuration response comprises a page-delimited series of deployment configurations, and wherein parsing the deployment configuration response comprises identifying the deployment configuration that shares the namespace with the containerized orchestration engine from among the page-delimited series of deployment configurations.

5. The computing system of claim 1, wherein the instructions, when executed by the processor, cause the processor to:
query a route API associated with the containerized application platform to obtain route data associated with a route of the containerized application platform, wherein the route refers to a pod of the one or more pods and provides a domain name system (DNS) entry point by which the pod is configured to be accessed by a device outside of the computing cluster; and
store, in the database, the route data and one or more relationships between: (i) the route data, and (ii) the deployment configuration data or the build configuration data.

6. The computing system of claim 1, wherein the instructions, when executed by the processor, cause the processor to:
query a group API associated with the containerized application platform to obtain group data associated with a group of the containerized application platform, wherein the group comprises a collection of users with access to the containerized application platform; and
store, in the database, the group data and one or more relationships between: (i) the group data, and (ii) the deployment configuration data or the build configuration data.

7. The computing system of claim 6, wherein the instructions, when executed by the processor, cause the processor to:
query a user API associated with the containerized application platform to obtain user data associated with a user of the containerized application platform; and
store, in the database, the user data and one or more relationships between: (i) the user data, and (ii) the deployment configuration data, the build configuration data, or the group data.

8. The computing system of claim 6, wherein the instructions, when executed by the processor, cause the processor to:
query a project API associated with the containerized application platform to obtain project data associated with a project of the containerized application platform, wherein the project is associated with the group, and wherein the group has been granted access to the namespace; and
store, in the database, the project data and one or more relationships between: (i) the project data, and (ii) the deployment configuration data, the build configuration data, or the group data.

9. The computing system of claim 1, wherein the instructions, when executed by the processor, cause the processor to:
query an image API associated with the containerized application platform to obtain image data associated with an executable image of the containerized application platform, wherein the executable image comprises instructions executable by the one or more pods of the one or more worker nodes to perform tasks associated with one or more of the containerized software applications; and
store, in the database, the image data and one or more relationships between: (i) the image data, and (ii) the deployment configuration data or the build configuration data.

10. The computing system of claim 9, wherein the instructions, when executed by the processor, cause the processor to:
query an image stream API associated with the containerized application platform to obtain image stream data associated with an image stream of the containerized application platform, wherein the image stream tracks one or more executable images configured to be deployed to one or more pods using the deployment configuration; and
store, in the database, the image stream data and one or more relationships between: (i) the image stream data, and (ii) the deployment configuration data, the build configuration data, or the image data.

11. The computing system of claim 1, wherein the database comprises a credential repository associated with the containerized application platform, and wherein the credential repository stores credentials used by the computing device to obtain permissions to access the deployment configuration API or the build configuration API.

12. The computing system of claim 11, wherein identifying the namespace associated with the containerized orchestration engine comprises receiving data from a user device that includes the credentials used by the computing device to obtain permissions to access the deployment configuration API or the build configuration API.

13. The computing system of claim 1, wherein the instructions, when executed by the processor, cause the processor to:
identify an additional namespace associated with the containerized orchestration engine;
query the deployment configuration API associated with the containerized application platform that shares the additional namespace with the containerized orchestration engine to obtain additional deployment configuration data associated with an additional deployment configuration of the containerized application platform;
query the build configuration API associated with the containerized application platform to obtain additional build configuration data associated with an additional build configuration of the containerized application platform; and
store, in the database, the additional deployment configuration data, the additional build configuration data, and one or more relationships between the additional deployment configuration data and the additional build configuration data.

14. The computing system of claim 1, wherein the instructions, when executed by the processor, cause the processor to:
one or more relationships between the deployment configuration data and one or more objects of the containerized orchestration engine; or
one or more relationships between the build configuration data and the one or more objects of the containerized orchestration engine.

15. A method comprising:
identifying, by a computing device disposed within a remote network management platform, a namespace associated with a containerized orchestration engine, wherein a database is also disposed within the remote network management platform, wherein the remote network management platform is associated with a managed network, wherein the managed network obtains service from a computing cluster that includes one or more worker nodes, wherein the one or more worker nodes are configured to execute containerized software applications using the containerized orchestration engine, and wherein the containerized orchestration engine facilitates management, execution, and distribution of the containerized software applications across one or more pods hosted on the one or more worker nodes;

querying, by the computing device, a deployment configuration application programming interface (API) associated with a containerized application platform that shares the namespace with the containerized orchestration engine to obtain deployment configuration data associated with a deployment configuration of the containerized application platform, wherein the containerized application platform provides tools configured to deploy and monitor the containerized software applications, and wherein the deployment configuration provides a deployment template by which one or more first executable images of the containerized software applications are deployed across the one or more pods using a replication controller of the containerized orchestration engine;

querying, by the computing device, a build configuration API associated with the containerized application platform to obtain build configuration data associated with a build configuration of the containerized application platform, wherein the build configuration provides a build template by which one or more second executable images of the containerized software applications are built from source code within the containerized application platform, and wherein at least one executable image is common between the one or more first executable images and the one or more second executable images; and storing, in the database and by the computing device, the deployment configuration data, the build configuration data, and one or more relationships between the deployment configuration data and the build configuration data.

16. The method of claim 15, comprising:

parsing, by the computing device, a response to the deployment configuration API query to identify whether a header corresponding to the containerized application platform is present; and upon identifying that the header is present, storing, in the database and by the computing device, an indication that the containerized application platform shares the namespace with the containerized orchestration engine.

17. The method of claim 15, wherein querying the deployment configuration API comprises:

generating, by the computing device, a deployment configuration API request that syntactically corresponds to the deployment configuration API;

submitting, by the computing device, the deployment configuration API request to the deployment configuration API;

receiving, by the computing device, a deployment configuration response based on the deployment configuration API request;

parsing, by the computing device, the deployment configuration response; and filtering out, by the computing device, deployment configuration data from the deployment configuration response that do not share the namespace.

18. The method of claim 17, wherein the deployment configuration response comprises a page-delimited series of deployment configurations, and wherein parsing the deployment configuration response comprises identifying the deployment configuration that shares the namespace with the containerized orchestration engine from among the page-delimited series of deployment configurations.

19. The method of claim 15, comprising:

querying, by the computing device, a route API associated with the containerized application platform to obtain route data associated with a route of the containerized application platform, wherein the route refers to a pod of the one or more pods and provides a domain name system (DNS) entry point by which the pod is configured to be accessed by a device outside of the computing cluster; and storing, in the database and by the computing device, the route data and one or more relationships between: (i) the route data, and (ii) the deployment configuration data or the build configuration data.

20. An article of manufacture including a non-transitory computer-readable medium, having stored thereon program instructions that, upon execution by a computing device disposed within a remote network management platform, cause the computing device to perform operations comprising:

identifying a namespace associated with a containerized orchestration engine, wherein a database is also disposed within the remote network management platform, wherein the remote network management platform is associated with a managed network, wherein the managed network obtains service from a computing cluster that includes one or more worker nodes, wherein the one or more worker nodes are configured to execute containerized software applications using the containerized orchestration engine, and wherein the containerized orchestration engine facilitates management, execution, and distribution of the containerized software applications across one or more pods hosted on the one or more worker nodes;

querying a deployment configuration application programming interface (API) associated with a containerized application platform that shares the namespace with the containerized orchestration engine to obtain deployment configuration data associated with a deployment configuration of the containerized application platform, wherein the containerized application platform provides tools configured to deploy and monitor the containerized software applications, and wherein the deployment configuration provides a deployment template by which one or more first executable images of the containerized software applications are deployed across the one or more pods using a replication controller of the containerized orchestration engine;

querying a build configuration API associated with the containerized application platform to obtain build configuration data associated with a build configuration of the containerized application platform, wherein the build configuration provides a build template by which one or more second executable images of the containerized software applications are built from source code within the containerized application platform, and wherein at least one executable image is common between the one or more first executable images and the one or more second executable images; and storing the deployment configuration data, the build configuration data, and one or more relationships between the deployment configuration data and the build configuration data.

* * * * *